United States Patent [19]
Oishi

[11] Patent Number: 5,150,259
[45] Date of Patent: Sep. 22, 1992

[54] OPTICAL IMAGING DEVICE

[75] Inventor: Noriji Oishi, Nagoya, Japan

[73] Assignee: Mitsubishi Rayon Company Ltd., Tokyo, Japan

[21] Appl. No.: 733,984

[22] Filed: Jul. 22, 1991

[30] Foreign Application Priority Data

| Jul. 30, 1990 | [JP] | Japan | 2-201854 |
| Jul. 30, 1990 | [JP] | Japan | 2-201855 |
| Jul. 30, 1990 | [JP] | Japan | 2-201856 |
| Jul. 30, 1990 | [JP] | Japan | 2-201857 |
| Sep. 21, 1990 | [JP] | Japan | 2-253008 |

[51] Int. Cl.$^5$ .............................................. G02B 5/04
[52] U.S. Cl. ................................... 359/619; 359/639; 359/623; 359/710
[58] Field of Search ............... 359/732, 619, 639, 623; 359/710

[56] References Cited

U.S. PATENT DOCUMENTS

| 3,584,952 | 6/1971 | Gundlach | 355/52 |
| 5,035,486 | 7/1991 | Inokuchi | 359/619 |

FOREIGN PATENT DOCUMENTS

| 56-117201 | 9/1981 | Japan . |
| 56-126801 | 10/1981 | Japan . |
| 56-140301 | 11/1981 | Japan . |
| 56-140302 | 11/1981 | Japan . |
| 56-149002 | 11/1981 | Japan . |
| 57-66414 | 4/1982 | Japan . |
| 57-104923 | 6/1982 | Japan . |
| 60-254018 | 12/1985 | Japan . |
| 60-254019 | 12/1985 | Japan . |
| 60-254020 | 12/1985 | Japan . |
| 61-210319 | 9/1986 | Japan . |
| 61-233714 | 10/1986 | Japan . |
| 62-91902 | 4/1987 | Japan . |
| 62-201417 | 9/1987 | Japan . |
| 2308122 | 12/1990 | Japan | 359/619 |

Primary Examiner—Paul M. Dzierzynski
Assistant Examiner—Hung Xuan Dang
Attorney, Agent, or Firm—Oblon, Spivak, McClelland, Maier & Neustadt

[57] ABSTRACT

An optical imaging device for projecting an image in a strip area, comprising a reflecting plate having a plurality of pairs of reflecting surfaces arranged on a flat surface and forming an array in a first direction parallel to a long direction of a strip image, and at least one cylindrical focusing lens or mirror having a focusing power directed only to a second direction perpendicular to the first direction. The pair of reflecting surfaces is composed of two flat surfaces which cross at about a $\pi/2$ radian, and the crossing line of two adjacent reflecting surfaces is perpendicular to the first direction. The reflecting plate projects the image component in parallel to the first direction and the cylindrical focusing lens or mirror projects an image component perpendicular to the first direction. The resolving power in the first direction of the obtained image is determined by the pitch length of the pair of reflecting surfaces.

38 Claims, 67 Drawing Sheets

OPTICAL IMAGING DEVICE

BACKGROUND OF THE INVENTION (1) Field of the Invention

The present invention relates to an optical imaging device having a short focal length and transmitting an strip image, and particularly, to an optical imaging device applicable to a facsimile, an electrophotographic copier, a LED printer and so forth.

(2) Description of the Related Art

The ongoing widespread use of facsimiles, electrophotographic copiers and LED printers has led to a demand for miniaturizing of these machines, but in such machines, since a total image is produced by scanning, an optical imaging device can transmit only a strip area of the image, at an image magnification of 1 in most cases, and therefore, a composite optical imaging device, which is an array of many small optical projecting devices arranged in the direction of the image strip is used. Each of the small optical imaging devices produces a small erect equal-magnification image on the image plane, and each small image partially overlaps the adjacent small images. Therefore, since a composite optical imaging device forms a total image by overlapping respective small images, each small optical imaging device must produce an erect equal-magnification image in the direction in which it is arranged. Usually these small optical imaging devices have small optical paths, and therefore, the optical path of the composite optical device from the object plane to the image plane is also short. The use of such an optical device enables a miniaturization of the above-mentioned machines, and furthermore, in general, such an optical device transmits a brighter image than those produced by conventional optical devices.

The known types of those optical devices are;

(a) an array of graded index lenses;

(b) an array having a plurality of small optical imaging devices each comprising a plurality of convex lenses, as disclosed, for example, in U.S. Pat. No. 3,584,952; and, (c) an array having a plurality of optical imaging devices each comprising convex lenses and a rectangular prism, as disclosed, for example, in Japanese Unexamined Patent Publication No. 56-117,201.

The optical imaging device of the above-mentioned (a) type comprises rod lenses having a cylindrical configuration. The refractive index distribution of each of these rod lenses changes sequentially in the radial direction from the center to the periphery thereof, and it is difficult to form such a refractive index distribution and to precisely control the distribution thereof. Further, it is particularly difficult to produce a wide diameter rod lens. Therefore, when it is necessary to widen the distance between the lens array surface and the object plane, the effective F number of this device is greatly reduced and accordingly, the brightness of the obtained image is lowered.

Further, the refractive index of the medium of rod lens is changed according to the wavelength thereof, and therefore, an image produced by this optical imaging device has a large chromatic aberration.

In the optical imaging device of above-mentioned (b) type, since one convex lens produces an inverted image, each small optical imaging device produces an inverted reduction image within itself for the first time, and then converts it to an erect equal-magnification image. The optical path in each small optical imaging device passes many times through the surfaces of the lenses, and therefore, the chromatic aberration of the obtained image becomes large due to the accumulation of refractive angles at those surfaces.

Further, it is difficult to assemble this type optical imaging device because many lenses must be precisely arranged. Therefore, to reduce these production difficulties, the lenses of the respective small optical imaging devices are preferably produced as one lot for each lens layer. Nevertheless, when producing a long size array by this method, it is not easy to match each optical axis of respective layers, due to an accumulation of dimensional errors.

The optical imaging device of above-mentioned (c) type has a small chromatic aberration because the accumulation of refractive angles is kept small by using a rectangular prism for inverting the image. Nevertheless, the center of the prism and the axis of the lens must be matched for each combination. If this matching is not precise, the irregularities of the light distribution are increased.

Further, optical imaging devices of all of the above-mentioned types have disadvantages in that the obtained images are affected by periodical brightness irregularities due to the overlapping of images having light differentials between the optical axes and peripheries thereof.

SUMMARY OF THE INVENTION

An object of the present invention is to provide an optical imaging device easily produced by a usual technique and projecting an image having little chromatic aberration and few brightness irregularities.

According to the present invention, the optical imaging device comprises a reflecting means composed of a plurality of pairs of reflecting surfaces arranged on a flat surface and forming an array in a first direction parallel to a long direction of a strip image, and a cylindrical focusing means having focusing power directed only to a second direction perpendicular to the first direction. The pair of reflecting surfaces is composed of two flat surfaces which cross at a $\pi/2$ radian, and the crossing line of two adjacent reflecting surfaces is perpendicular to the first direction.

According to the another aspect of the present invention, the angle at which the two reflecting surfaces cross is smaller than the $\pi/2$ radian.

According to the another aspect of the present invention, at least one surface of the pair of reflecting surfaces is a cylindrical reflecting surface having a focusing power directed only to the first direction.

According to the another aspect of the present invention, the optical imaging device further comprises another cylindrical focusing means having a plurality of identical cylindrical lenses arranged on a flat surface and forming an array in the first direction, each of the cylindrical lenses having a focusing power only in the first direction. According to a modification of this aspect of the present invention, the width of each of the cylindrical lens of the cylindrical lens array is equal to $(N+0.5)p$, wherein N is integer of more than 1 and p is the pitch length of each pair of reflecting surfaces, or more than triple the pitch length of each pair of reflecting surfaces.

According to the another aspect of the present invention, the optical imaging device comprises the above reflecting means and focusing means composed of a plurality of convex lenses arranged on a flat surface and forming an array in the first direction, each of the convex lenses having a same focal length; the width of each convex lens of the convex lens array being equal to (n+0.5)p, wherein n is integer of more than 1 and p is the pitch length of the pairs of reflecting surfaces, or more than triple the pitch length of each pair of reflecting surfaces.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
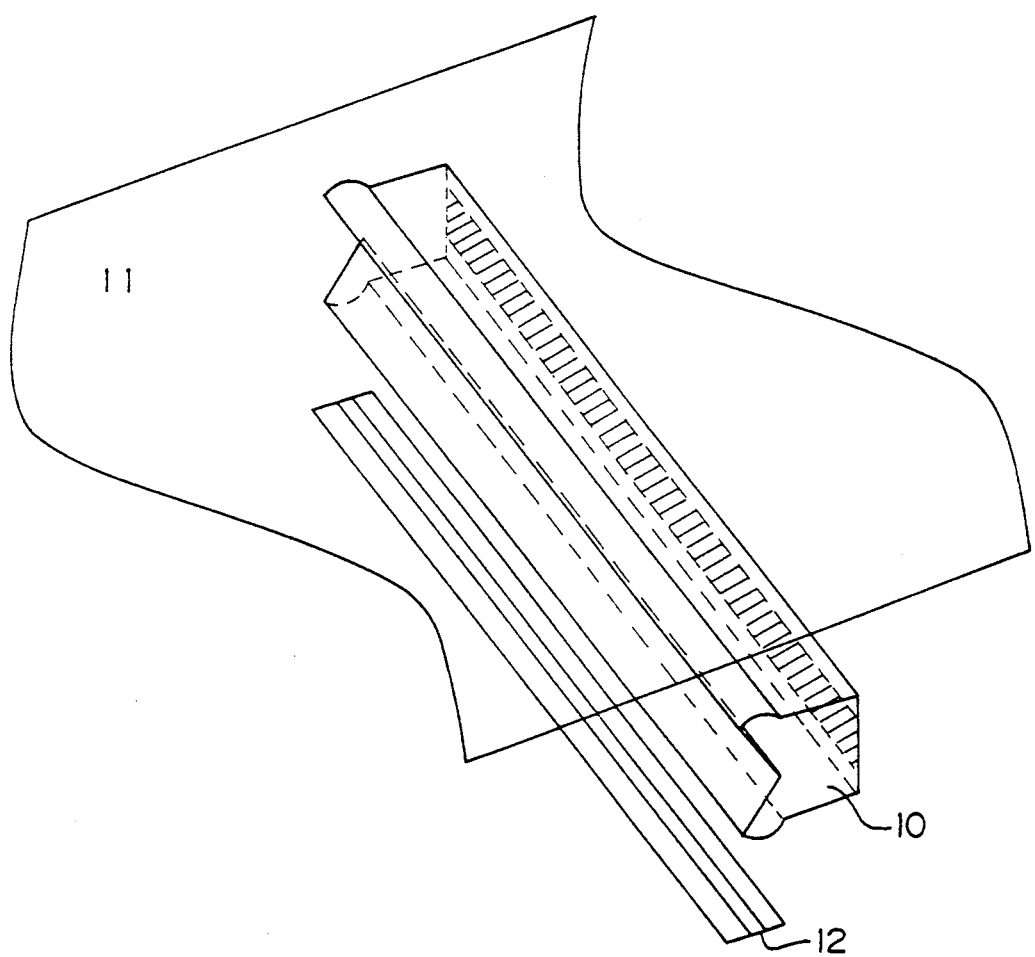
FIG. 1 is a perspective view of the optical imaging device according to the present invention when applied to an image digitizing machine.

FIG. 1 shows an example of an optical imaging device according to the present invention, when applied to an image digitizing apparatus. In the apparatus shown in FIG. 1, the optical imaging device 10 transmits a strip image of the original 11 onto an image sensor 12, and the image area corresponds to the area of detection of the image-sensor 12. The strip image is an equal-magnification image in the direction of the long axis of the strip area. In an electrophotographic copier, the image sensor is replaced by a photoconductor drum. In an LED printer, the original 11 and the image sensor 12 are respectively replaced by an array of LEDs and a photoconductor drum.

Figure 2:
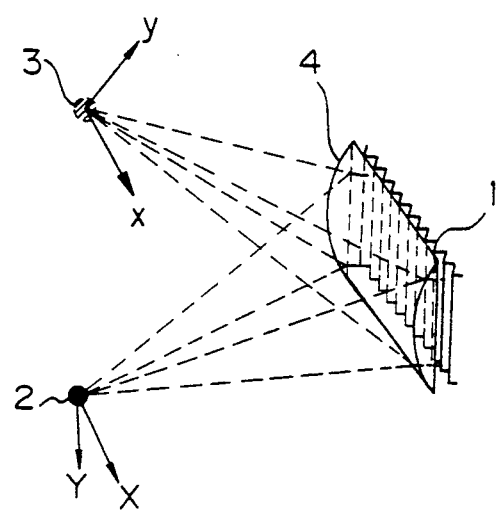
FIG. 2 shows a fundamental construction of the first embodiment, which includes cylindrical lenses and has a symmetrical construction opposite a reflecting surface.

FIG. 2 shows a fundamental construction of the optical imaging device according to the first embodiment of the present invention. In FIG. 2, a reflecting plate 1 has a plurality of pairs of reflecting surfaces arranged on a flat surface and forming an array in the x direction, and a cylindrical lens 4 having a focusing power in only the direction perpendicular to the x direction. Each pair of reflecting surfaces of the reflecting plate 1 is composed of two flat surfaces crossing at the $\pi/2$ radian, and each crossing line of two adjacent reflecting surfaces is perpendicular to the x direction. As described later, the cylindrical lens 4 can be replaced by another cylindrical focusing means such as cylindrical mirrors.

As shown in FIG. 2, the optical imaging device receives light rays from an object 2 and projects them onto an image 3. The image projecting area is a strip area which has a long axis in the x direction, and hereafter, the x direction is denoted as a first direction or an arrangement direction, and the y direction perpendicular to the x direction on the object plane or the image plane is denoted as a second direction.

Figure 3:
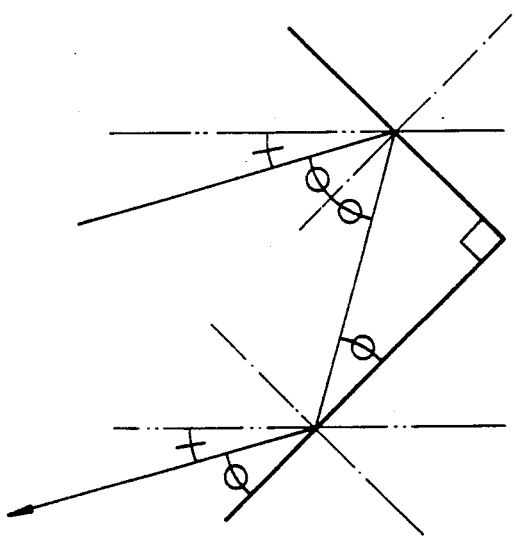
FIG. 3 shows a light ray trace which enters a pair of reflecting surfaces.

The focusing operation of the present optical imaging device is now explained. FIG. 3 is a cross sectional view of a pair of two reflecting surfaces crossing at a right angle ($\pi/2$ radian). As shown in FIG. 3, it is apparent that light rays incident on the pair of reflecting surfaces are returned in the opposite direction in the plane perpendicular to both reflecting surfaces.

Figure 4:
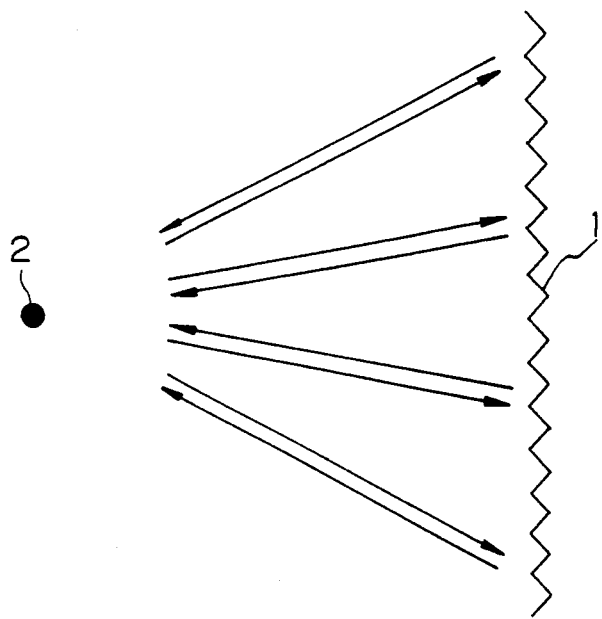
FIG. 4 shows light ray traces which enter a reflecting plate.

FIG. 4 shows traces of the light rays emitted from a point object 2 and entering the reflecting plate 1.

Figure 5:
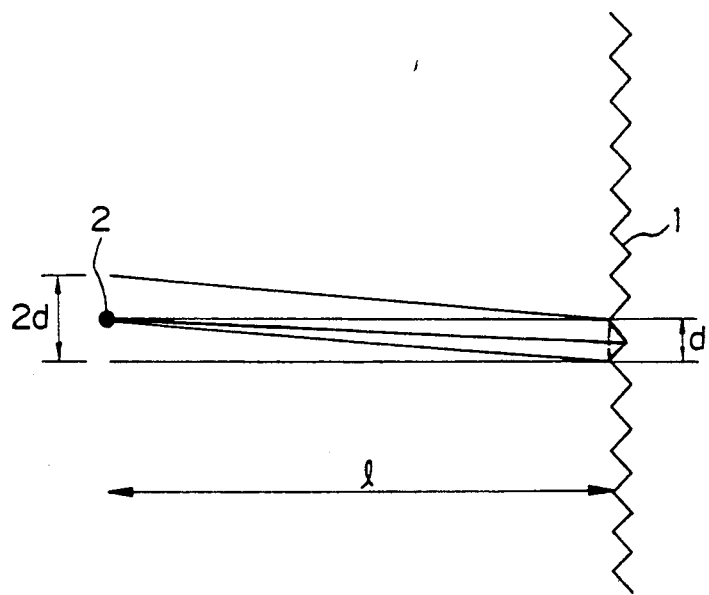
FIG. 5 shows light ray traces which are emitted from a point object and enter a pair of reflecting surfaces.

As shown in FIG. 3, light rays entering each pair of reflecting surfaces of the reflecting plate 1 are returned in opposite direction, and therefore, all light rays reflected at each pair of reflecting surfaces, respectively, are returned to the vicinity of the point object 2. If the pitch length of each pair of reflecting surfaces is sufficiently small, the point image of the point object 2 is produced at the same position as that of the point object in this plane. This is equivalent to the phenomenon that the reflecting plate 1 has an image focusing function in this plane. The resolving power of the reflecting plate 1 is determined by the pitch length of the pair of reflecting surfaces. FIG. 5 shows traces of the light rays which are emitted from a point object 2 and reflected at a pair of reflecting surfaces. As shown in FIG. 5, the width of the image is a double width 2d of the pitch length d of the pair of reflecting surfaces. This holds true in a range where the angle of incidence angle on the reflecting plate 1 is not too large.

Figure 6:
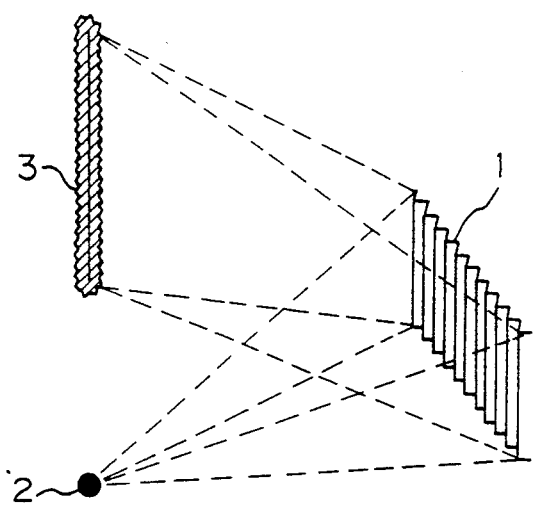
FIG. 6 shows light ray traces in three dimensions, which are emitted from a point object and enter a reflecting plate.

The above description explains the focusing function in a plane perpendicular to both reflecting surfaces of the reflecting plate 1. The focusing function in three dimensions can be explained separately, in the respective planes. FIG. 6 shows the focusing function of the reflecting plate in three dimensions. As shown in FIG. 6, the reflecting plate 1 produces an image 3 of a point object 2, and this image 3 is elongated in the direction perpendicular the arrangement direction of pairs of reflecting surfaces (first direction). In the present embodiment, the optical imaging device further comprises a cylindrical lens 4 which has a focusing power in the plane perpendicular to the first direction, and focuses an image component in this plane as shown in FIG. 2. Therefore, the combination of the reflecting plate 1 and the cylindrical lens 4 receives light rays from a point object 2 and precisely focuses those rays onto the point image 3 in three dimensions. In FIG. 2, the optical path from the point object 2 to the image 3 passes through the cylindrical lens 4 before and after reflecting the reflecting plate 1.

Therefore, the focusing condition of the optical imaging device according to the present embodiment is such that the optical paths from the object 2 to the reflecting plate 1 and from the image 3 to the reflecting plate 1 are equal, and the object 2 and the image 3 are the conjugate points of the cylindrical lens 4.

The optical imaging device shown in FIG. 2 is symmetrically opposite the reflecting plate 1, and satisfies the above condition. The image produced by the optical imaging device shown in FIG. 2 is an equal magnification image which is erect in the first direction and inverted in the second direction.

Figure 7:
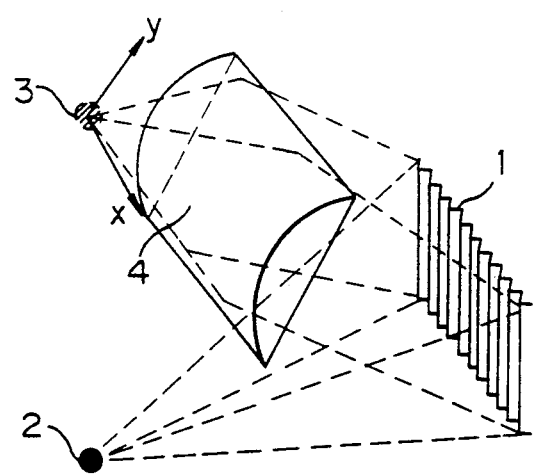
FIG. 7 shows another fundamental construction of the first embodiment, having a construction which is not symmetrical opposite a reflecting surface.

Nevertheless, since the cylindrical lens is required only to focus the second direction component, other modifications can be made in which the cylindrical lens is only in the optical path either from the object to the reflecting plate or from the reflecting plate to the image. FIG. 7 shows an example of these modifications. FIG. 7 shows a cylindrical lens 4 in the optical path from the reflecting plate 1 to the image 3, and therefore, in this modification, the optical paths from the object 2 to the reflecting plate 1 and from the image 3 to the reflecting plate 1 are not symmetrical.

Figure 8:
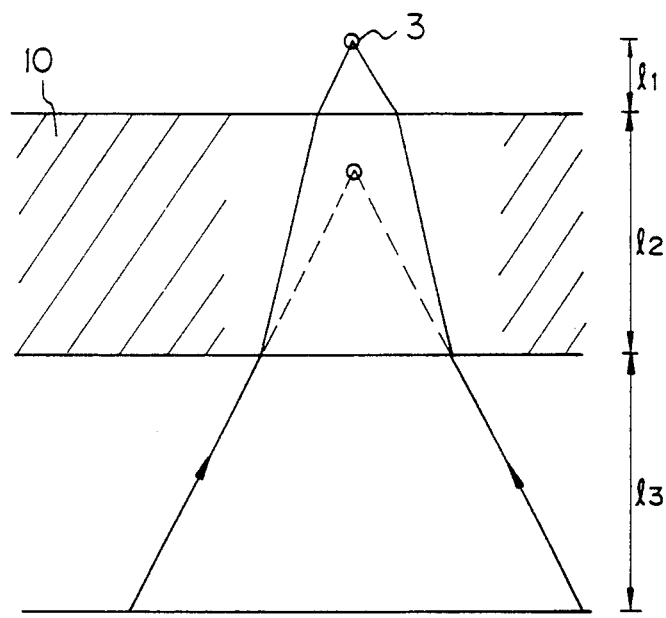
FIG. 8 shows a movement of the focusing point due to the presence of a different refractive medium.

A medium corresponding to the cylindrical lens exists only in the optical path from the image 3 to the reflecting plate 1, and therefore, the position of the image 3 moves. FIG. 8 shows the movement of the focusing point due to the existence of a different medium 10 in the optical path. The value of the positional movement in FIG. 8 is easily obtained by the paraxial ray treatment.

Namely, when a different refractive index medium 10 exists in the optical path from the object to the reflecting plate and from the image to the reflecting plate, both optical paths are required to satisfy the following conditions;

Each parameter $\gamma$ of both optical paths from the object to the reflecting plate and from the image to the reflecting plate must be almost equal. The parameter $\gamma$ is given by the following formula (1);

$$\gamma = \Sigma_k l_k / n_k \tag{1}$$

wherein,
$l_k$ is a thickness of each respective medium in an optical path,
$n_k$ is a refractive index of respective medium in an optical path.

For example, as shown in FIG. 8, when a medium 10 exists in the air space between the image 3 and the reflecting plate 1, $\gamma$ is a total addition of $\gamma_1$, $\gamma_2$ and $\gamma_3$, wherein $\gamma_1$ is the air thickness $l_1$ between the image and the surface of the medium 10 divided by the refractive index n of the air, $\gamma_2$ is the thickness $l_2$ of the medium 10 divided by the refractive index $n_2$ of the medium 10, and $\gamma_3$ is the air thickness $l_3$ between the surface of the medium 10 and the reflecting plate divided by the refractive index of the air.

When the light rays diagonally enter the reflecting plate 1 as shown in FIG. 2 and FIG. 7, it is impossible to fully satisfy the above-mentioned condition because parameters $\gamma$ of the light rays are different according to the incident positions thereof on the reflecting plate 1. These differences are produced by light rays passing through cylindrical lens having different thickness, according to the incident positions thereon. This is why the expression "each parameter $\gamma$ of both sides is substantially equal" is used in the claims. In practice, however, the optical imaging device has sufficiently focusing property if the differences of the parameters $\gamma$ are small.

The optical imaging device as shown in FIG. 7 must satisfy the above-mentioned condition. The cylindrical lens 4 projects the image 3 of the object 2 in the second direction, and the image obtained by the device shown in FIG. 7 is erect and equally-magnified in the first direction, and is inverted and reduced in the second direction. Conversely, when a cylindrical lens is positioned in the path between the object and the reflecting plate, the obtained image is inverted and magnified in the second direction.

Namely, as described above, the optical imaging device according to the first embodiment projects an erect equal-magnification image in the first direction, and projects an inverted image having a magnification which can be optionally determined in the second direction. The resolving power of the image obtained in the first direction is a double pitch width of the pairs of reflecting surfaces. The focusing condition of this device is such that the above parameters $\gamma$ in both the object and image sides are substantially equal, and the cylindrical lens projects the image component in the second direction from the object plane to the image plane. The relative position between the reflecting plate and the cylindrical lens in parallel directions does not influence the focusing conditions, and therefore, only the distance between the reflecting plate and the cylindrical lens is must be precisely set.

When the pitch length of the pair of reflecting surfaces is sufficiently small, in comparison to the distance between the reflecting plate and image plane, the brightness distribution of the obtained image is very flat. Further, the obtained image has no chromatic aberration in the first (x) direction, and the chromatic aberration in the second (y) direction is as small as that obtained by the above-mentioned conventional type (c).

In applications of the present device to machines such as an electrophotographic copier, optical imaging devices are generally required to transmit equal magnification images in both directions. Therefore, an optical imaging device a shown in FIG. 2 is suitable for use in such a machine, because this optical imaging device has a symmetrical construction. Other devices which have a non-symmetrical construction also produce equal-magnification image in both directions, and this symmetrical construction is easily assembled.

Figure 9A:
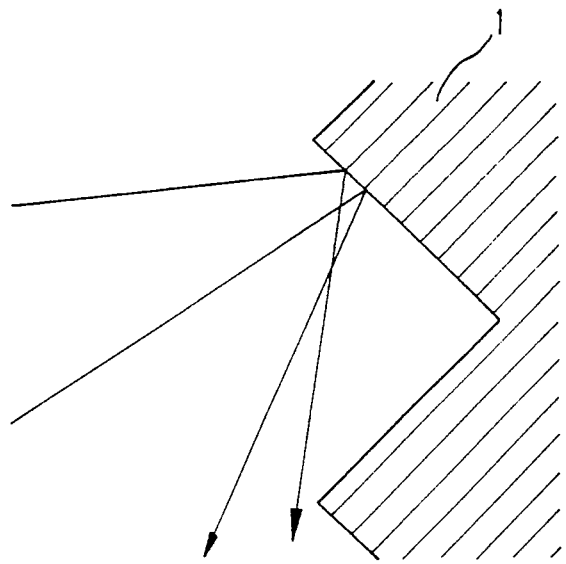
FIG. 9A shows a mechanism of an occurrence of stray light due to a reflecting at only one surface.

In the above description, light rays entering a reflecting plate 1 are returned in the opposite direction as shown in FIGS. 3 and 4. Strictly speaking, however, light rays which are reflected at only one surface of the pair of reflecting surfaces are not returned in the opposite direction as shown in FIG. 9A, and these light rays become to stray light rays which cause a lowering of the contrast of the image. Generally speaking, the light rays entering the reflecting plate at a large angle easily become stray lights, and therefore, preferably an optical imaging device according to the present embodiment comprises a plurality of light shield surfaces as shown in FIG. 9B; these light shield surfaces eliminate the stray light.

Figure 9B:
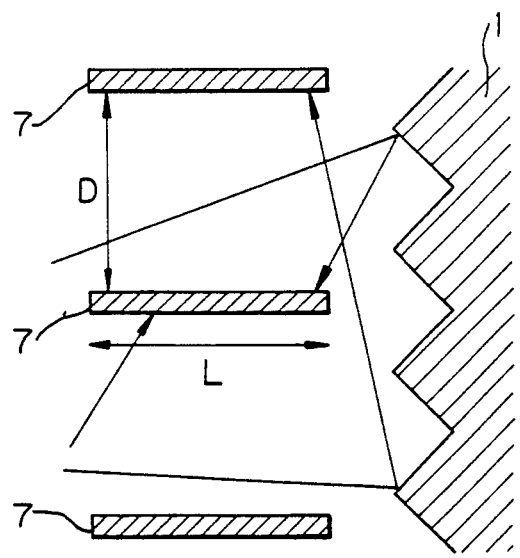
FIG. 9B shows an example of light shield surfaces for reducing stray light.

The light shield surfaces 7 shown in FIG. 9B are thin black plates which absorb light, and are arranged parallel to the arrangement direction of the pairs of reflecting surfaces. Each of the light shield surfaces is perpendicular to the arrangement direction of the pairs of reflecting surfaces, and when the reflecting plate 1 and the light shield surfaces 7 are in the same medium as shown in FIG. 9B, the stray lights are eliminated if the length L of each light shield surface and the arrangement distance D between adjacent light shield surfaces satisfies the following condition;

$$L \geq D \tag{5}$$

The light shield surfaces which satisfy the above condition can eliminate light entering the reflecting plate at more than a $\pi/4$ radian, and therefore, as shown in FIG. 9A, incident light having an angle of incidence of more than $\pi/4$ radian which becomes stray light, is eliminated before being reflected at the reflecting plate, and stray light which have an angle of more than $\pi/4$ radian after reflection is also eliminated.

An example of these methods need for forming the reflecting plates of the present embodiment is a plastic molding method. The pitch length of the pairs of reflecting surfaces should be made as small as possible, to obtain a high resolution image, but when the pitch length is small, it is difficult to obtain the precise surface configurations, and thus the quality of the obtained image is lowered. The pitch length of the pairs of reflecting surfaces should be determined with reference to these factors.

For example, there was practically produced an array of pairs of reflecting surfaces in the form of a prism array, by press molding onto an acrylic plate; the pitch length of a prism array is 0.5 mm. It was formed that, when the distance between the reflecting plate and the image surface is 10 to 40 mm, a good image having a low brightness irregularity can be obtained. Although, the resolution of this example as low as 1 mm, for use in, for example, electrophotographic copiers and facsimiles, but it is not difficult to make a prism array with a pitch length of less than 0.1 mm, to thus made one with a high resolution.

Figure 10A:
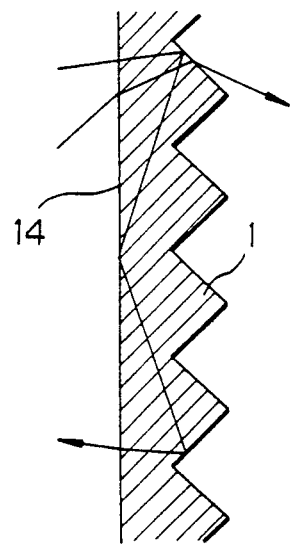
FIG. 10A shows a reflecting plate formed of prisms using a total reflection and light ray traces entering to this reflecting plate.

The reflecting surfaces can be produced by metal deposition on the plastic surfaces, but another method of forming reflecting plates such that the total reflection of inner surfaces is used, as shown in FIG. 10A is known. As well known, when light rays enter a boundary surface, the propagation direction of the light rays is change according to the difference of the refractive indexes. When light rays enter a boundary surface from the medium of refractive index n to the air at the angle more than a critical angle $\theta_c$, all light rays are fully reflected. This is called a total reflection. This critical angle $\theta_c$ is given by the following formula;

$$\theta_c = \sin^{-1}(1/n).$$

Figure 10B:
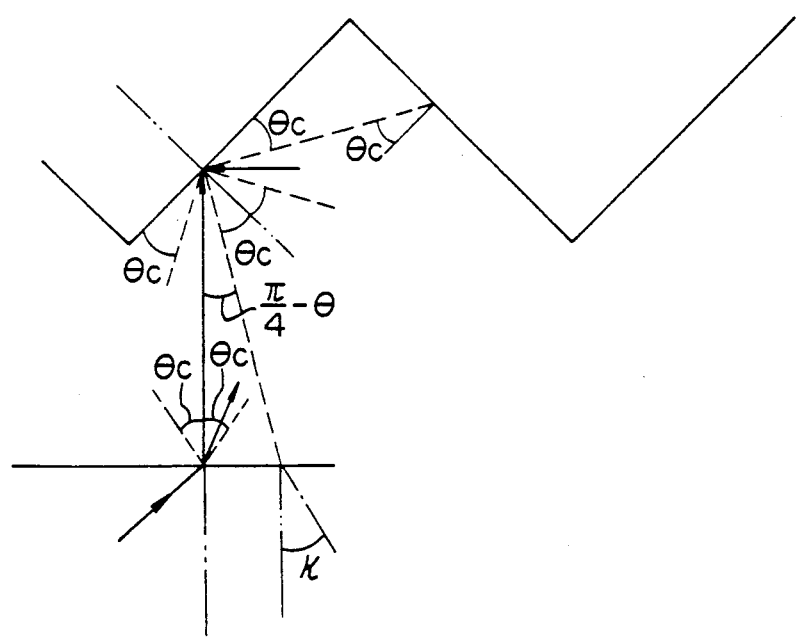
FIG. 10B shows the incident angle range in which incident light rays can be returned from the reflecting plate having total reflection prisms.

When the reflecting plate is formed by a plastic molding using the total reflection, light rays which enter from the air to the first surface 14 of the reflecting plate always have an incident angle that is less than the critical angle $\theta_c$ within the plate, as shown in FIG. 10B. Therefore, compared to the reflecting plate shown in FIG. 9A, the reflecting plate 1 shown in FIG. 10B receives less light rays having large angles opposite to the arrangement direction, which rays can easily become stray light rays.

Further, light rays which enter the first surface 14 at a right angle enter the prism surface at the angle $\pi/4$, and light rays which have incident angles less than the critical angle $\theta_c$ to the prism surfaces also pass through the reflecting surfaces. Further, light rays which enter the first prism surface at incident angles more than $\pi/2 - \theta_c$ enter the second prism surface at the incident angle of less than $\theta_c$ after the first reflection, and pass through the second prism surface. Therefore, as shown in FIG. 10B, almost all of the light rays having an incident angle of more than $\kappa$ passes through the reflecting plate. $\kappa$ is given by the following formula;

$$\kappa = n \sin^{-1}(\pi/4 - \theta_c) \tag{6}$$

wherein, n is a refractive index of the prism medium.

Therefore, when the prism array is used as the reflecting surfaces, little stray light occurs.

When the reflective index of the reflecting plate is a square root 2, the critical angle $\theta_c$ is $\pi/4$ radian. If the critical angle $\theta_c$ is $\pi/4$, the light ray entering the surface from the air to the reflecting plate at a right angle has a critical angle $\theta_c$ at the reflecting surfaces. Therefore, half of the incident light passes through the first reflecting surface of the pair of reflecting surfaces, and half of the incident light, reflected at the first surface pass through the second surface, remains because the incident angle to the second surface is within the critical angle $\theta_c$. Consequently, the refractive index of the reflecting plate must be more than the square root 2. Nevertheless, it is apparent that the refractive index of the reflecting plate determines the ratio of returning light rays relative to incident light rays, and therefore, the refractive index of the reflecting plate must be as large as possible.

Figure 10C:
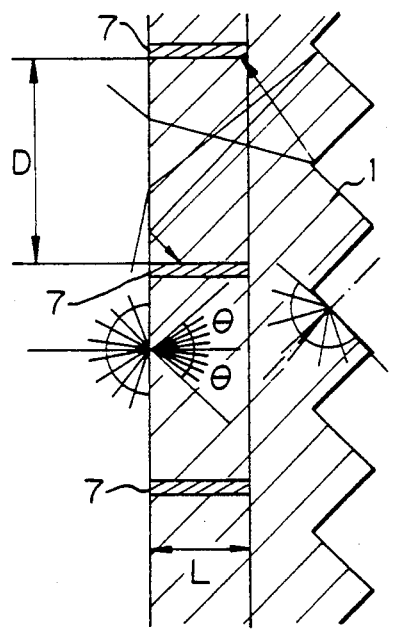
FIG. 10C shows an example of light shield surfaces provided within the same medium of the reflecting plate.

The amount of stray light is less in the above reflecting plate having the total reflection prism than in the reflecting plate as shown in FIG. 9A, but the stray light cannot be completely eliminated. Therefore, the device using a total reflection prism also should comprise a plurality of light shield surfaces as shown in FIG. 10C. The light shield surfaces 7 as shown in FIG. 10C are arranged in a transparent plate having the same refractive index as the reflecting plate, and the transparent plate optically adhered to the reflecting plate. As described above, all incident lights have an angle less than the critical angle $\theta_c$ ($<\pi/4$) in the reflecting plate, and all stray lights reflected at the first surface have an incident angle more than the critical angle $\theta_c$ in the first incident surface and are fully reflected. Therefore, the stray lights are properly eliminated if the length L and the arrangement pitch distance D of the light shield surfaces satisfy the following condition;

$$L \geq D/2 \tag{7}$$

It is apparent that the light shield shown in FIG. 10C can be thinner than the light shield shown in FIG. 9B.

The above description shows the light shield directly arranged in front of the reflecting plate, but it can be arranged at another position. Nevertheless, the direct arrangement in front of the reflecting plate is preferable because the light shield should be arranged as far as possible from the object and the image, in order to reduce any brightness irregularities due to the light shield. Also, the light shields should be arranged in both optical paths, from the object to the reflecting plate and from the reflecting plate to the image, and thus the light shield can be commonly used if directly arranged in front of the reflecting plate.

Next, examples of practical modifications for applying the optical imaging device of the first embodiment to machines are explained. In all of these examples, the reflecting plates 1 are formed of a prism array.

Figure 11A:
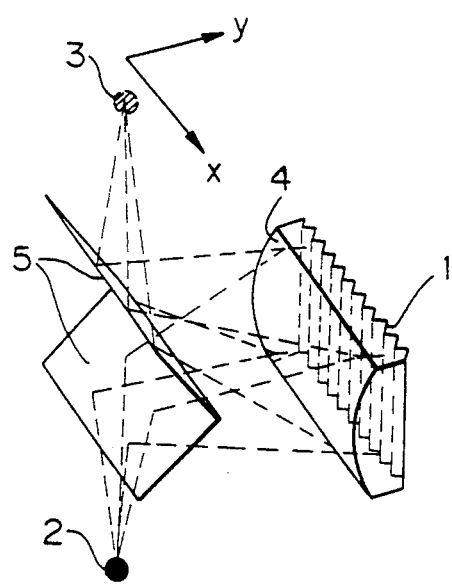
FIGS. 11A, 12A, 13A, 14A, 15A, 16A, 17A, 18A, 19A, 20A, 21A, 23A, 25A and 26A show perspective views of modifications of the first embodiment having cylindrical lenses.
Figure 11B:
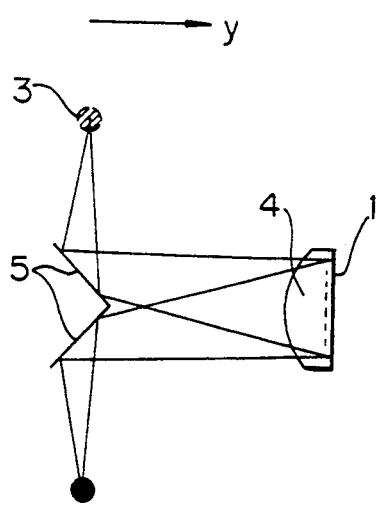
FIGS. 11B, 12B, 13B, 14B, 15B, 16B, 17B, 18B, 19B, 20B, 21B, 23B, 25B and 26B are cross sectional views of these modifications.

FIGS. 11A and 11B show a modification in which a cylindrical lens 4 and a reflecting plate 1 are incorporated into a block. FIG. 11A is a perspective view and FIG. 11B is a cross sectional view. This block is formed by molding. Further, this modification comprises tow folding mirrors 5 for parallelizing an object plane and an image plane. The image area is a strip having a long axis in the x direction, and the image 3 of the point object 2 is obtained at the position shown in FIG. 11A. The obtained image is an equal-magnification image in the x and y directions.

Figure 12A:
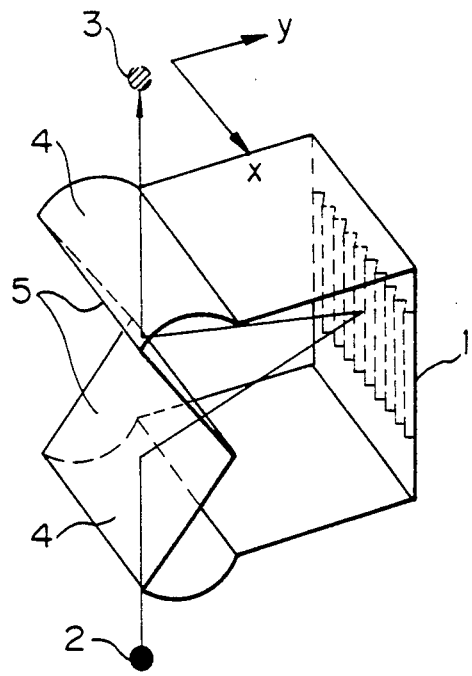
Figure 12B:
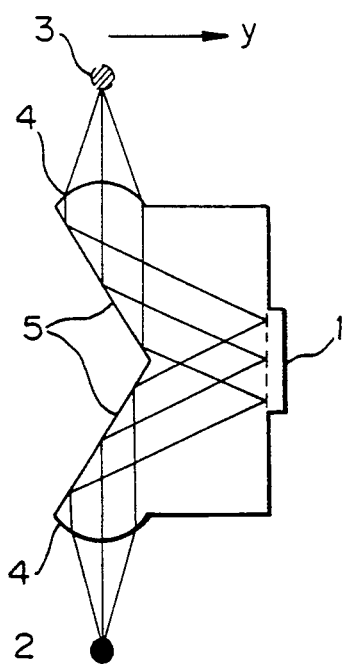

FIGS. 12A and 12B show a modification in which two cylindrical lenses 4, a reflecting plate 1, and two folding mirrors 5 are incorporated. FIG. 12A is a perspective view and FIG. 12B is a cross sectional view. The object plane and the image plane are also parallel. When both cylindrical surfaces 4 respectively performing cylindrical lens functions are the same, an equal-magnification image is obtained in both directions. If the cylindrical surfaces 4 are different, an obtained image can be magnified or reduced in the y direction. This is commonly possible in the following examples.

Figure 13A:
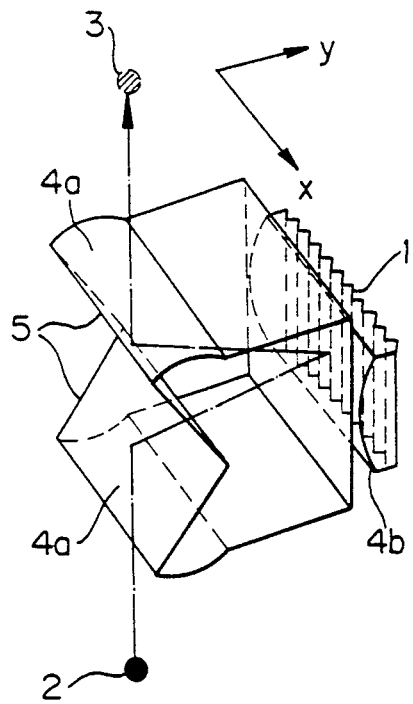
Figure 13B:
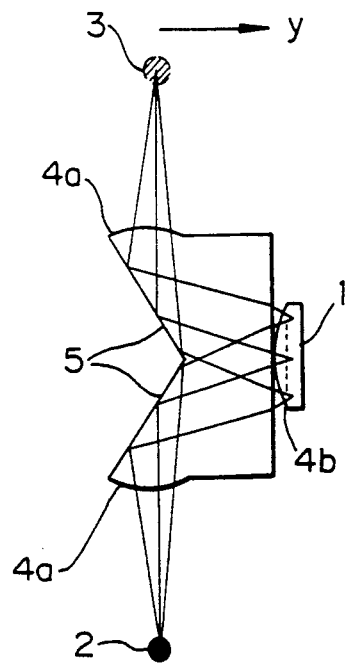
Figure 14A:
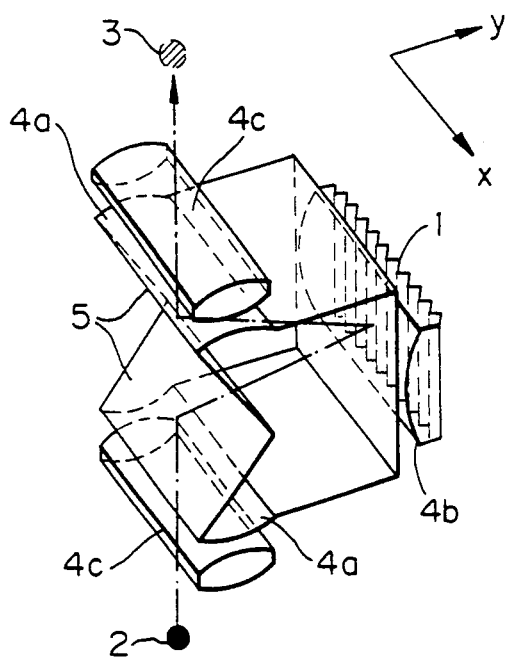
Figure 14B:
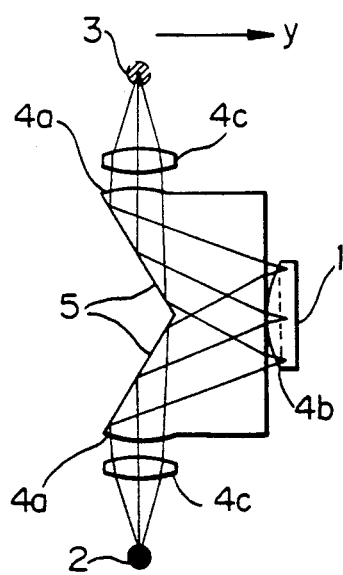

FIGS. 13A and 13B show a modification in which two cylindrical lenses 4a and two folding mirrors 5 are incorporated, and a reflecting plate 1 and a cylindrical lens 4b are incorporated, respectively. FIG. 13A is a perspective view and FIG. 13B is a cross sectional view. The functions of the cylindrical lenses 4 shown in FIGS. 12A and 12B are divided into the cylindrical lenses 4a and cylindrical lens 4b, and by dividing the functions of the cylindrical lens, the curvature of each of the cylindrical lenses can be made smaller, which makes the total aberrations of the device smaller. As shown in FIGS. 14A and 14B, the number of cylindrical lenses can be increased.

Figure 15A:
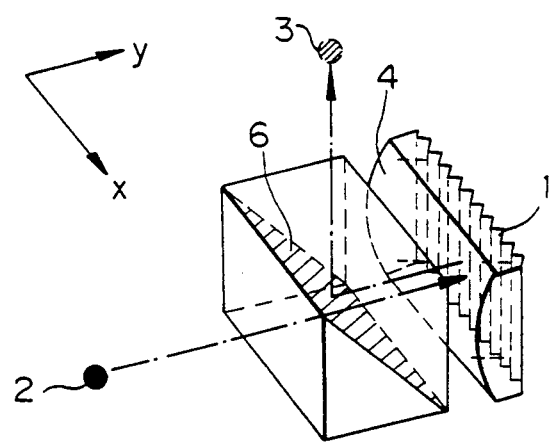
Figure 15B:
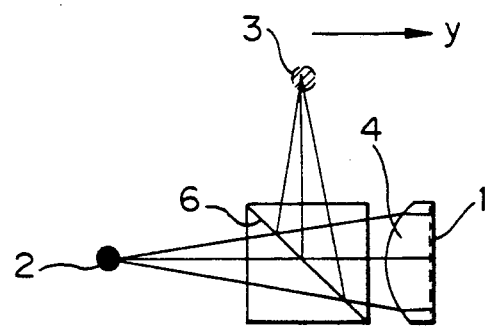
Figure 16A:
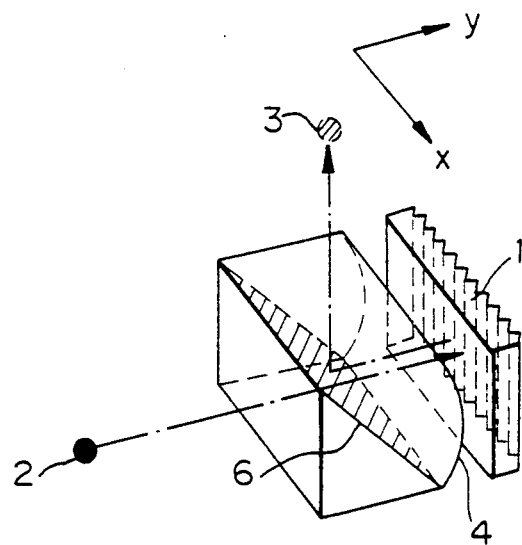
Figure 16B:
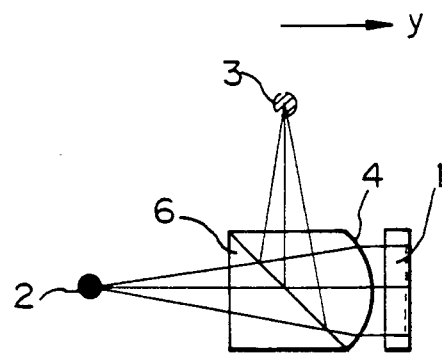

FIGS. 15A and 15B show a modification in which a reflecting plate 1 and a cylindrical lens 4 are incorporated in the same way as shown in FIGS. 11A and 11B. FIG. 15A is a perspective view and FIG. 15B is a cross sectional view. A beam splitter having a semitransparent mirror 6 is comprised for dividing optical paths to an object side and an image side. The object surface is perpendicular to the image surface. When a cylindrical lens 4 and a beam splitter are incorporated as shown in FIGS. 16A and 16B, the optical imaging device has same function as that of the device shown in FIGS. 15A and 15B.

Figure 17A:
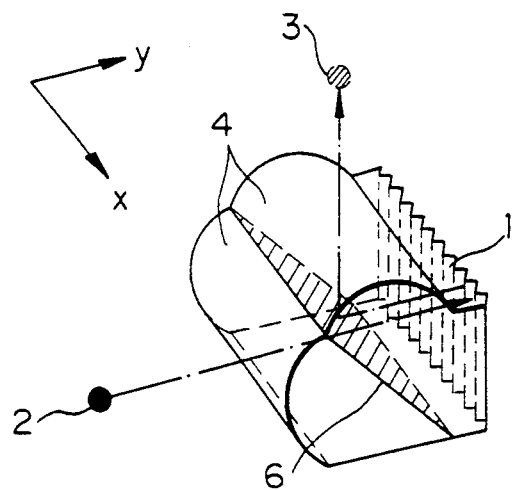
Figure 17B:
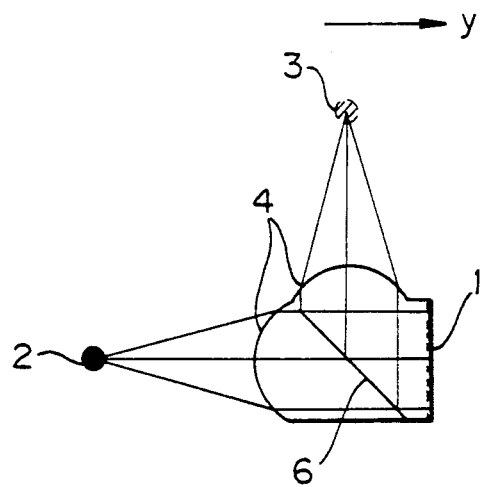

In the modification shown in FIGS. 17A and 17B, two cylindrical lenses 4 and a reflecting plate 1 are incorporated with a beam splitter.

Figure 18A:
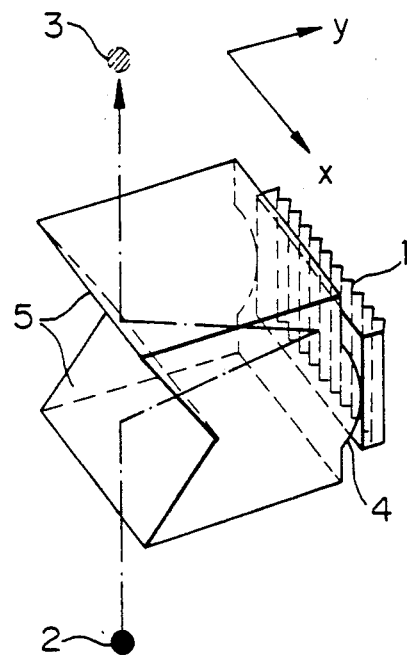
Figure 18B:
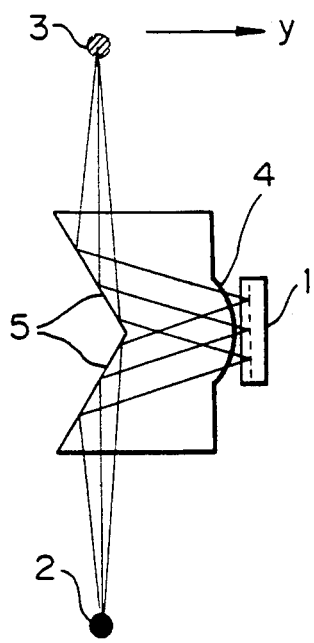
Figure 19A:
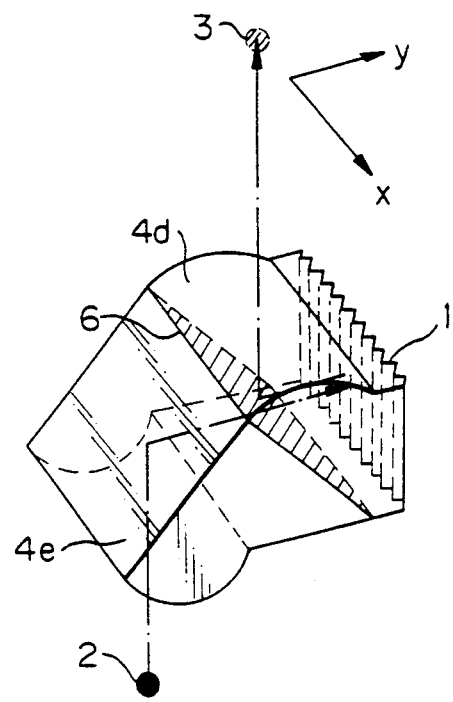
Figure 19B:
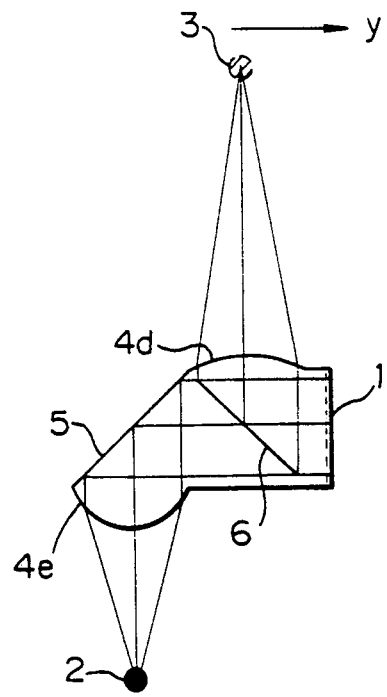
Figure 20A:
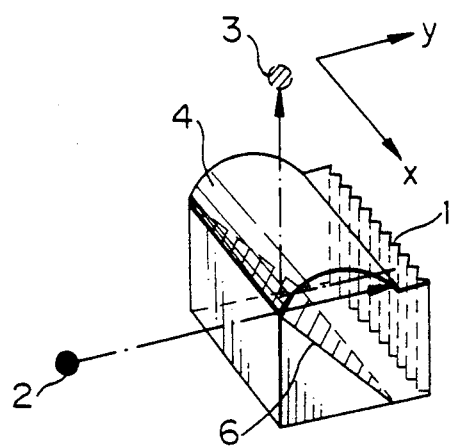
Figure 20B:
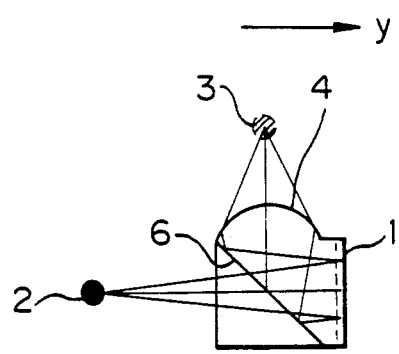

In the modification shown in FIGS. 18A and 18B, a reflecting plate is separately formed, and a cylindrical lens 4 and two folding mirrors 5 are incorporated.

When different cylindrical lenses exist in either optical path from the object to the reflecting plate or from the image to the reflecting plate shown in FIGS. 13A, 14A and 17A, the optical imaging device can transmit a magnified or reduced image in the y direction. The modifications shown in FIGS. 19A, 19B and 20A, 20B realize the above function.

When a optical imaging device comprises a beam splitter as shown in FIGS. 15A, 16A and 17A, the light rays from the object to the image are reflected at and transmitted through the semitransparent mirror 6. Accordingly, when the reflectance ratio and transmittance ratio of the semitransparent mirror 6 are respectively 50%, only 25% of the light emitted from the object and entering the effective aperture of the device is focused at the image. In practice, the brightness of the obtained image is substantially determined by the reflectance and transmittance ratio of the semitransparent mirror 6, the reflectance ratio of the reflecting plate, and the brightness of the object. The brightness image can be obtained when the reflectance ratio and the transmittance ratio are respectively 50%.

Figure 21A:
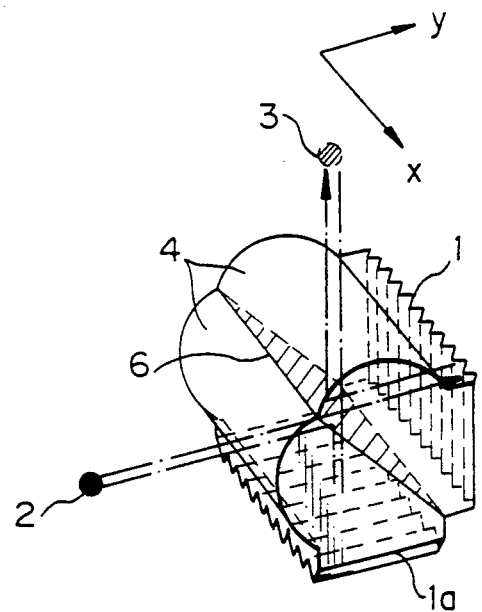
Figure 21B:
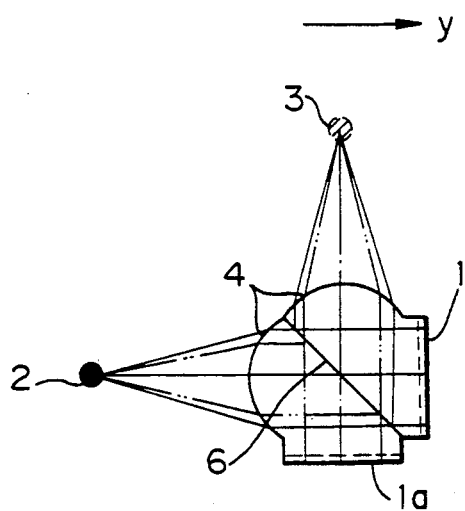

In the modification shown in FIGS. 21A and 21B, a reflecting plate 1a is further added to the optical imaging device shown in FIGS. 17A and 17B, and an image having twice the brightness can be obtained, compared to that from the device shown in FIGS. 17A and 17B.

Figure 22A:
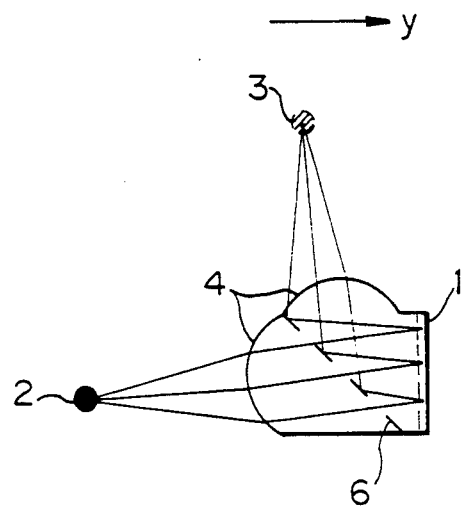
FIG. 22A is a cross sectional view of an example of the first embodiment, in which the image surface is perpendicular to the object surface.

Further, in the modification shown in FIG. 22A, the semitransparent mirror 6 shown in FIG. 17B is replaced by a surface having a grid formed of reflecting strips and transparent strips of same width. The brightness on the image surface changes according to the position in the y direction. Namely, when the point object 2 is at the center of the projecting area, light rays from the object 2 enter the cylindrical lens and are changed to parallel light rays. The parallel light rays travel to the surface 6 and half thereof enter transparent strips and pass through the surface 6, and the other half are reflected at the reflecting strips. Then, the light rays passing through the surface 6 are reflected at the reflecting plate 1 and returned in the opposite direction. These reflecting light rays return on the same paths and are focused in the vicinity of the object 2, and therefore, no light rays are distributed to the point on the image plane according with this object 2.

Figure 22B:
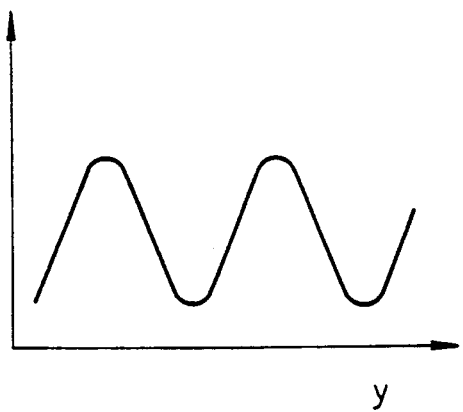
FIG. 22B shows an image brightness distribution.

When the point image 2 is shifted slightly, as shown in FIG. 22A, all parallel light rays passing through the transparent strips can be fully reflected at the reflecting strips, and therefore, a bright image of the object 2 can be formed at the point on the image plane according with this object 2. Namely, the brightness distribution as shown in FIG. 22B is obtained on the image plane. In the applications to a linear image sensor or a LED printer, the width of the image area can be made small, and therefore, a narrow bright area can be used. The maximum brightness of this narrow area is double that obtained in the device shown in FIGS. 17A and 17B.

In the modifications shown in FIGS. 12A, 17A, 21A and 22A, optical elements such as a beam splitter and folding mirrors are placed neither between the object plane and the cylindrical lens of object side nor between the cylindrical lens of the image side and the image plane, and therefore, a short focal length cylindrical lenses can be used and a bright image obtained.

When the effective focal length of the cylindrical lenses is short, although a bright image can be obtained, the focal depth becomes short. Conversely, when effective focal length of the cylindrical lenses is long, although an obtained image becomes dark, the focal depth becomes long. When a long focal length cylindrical lens is used, the modifications as shown in FIGS. 11A, 15A, 16A and 18A can make the total device more compact.

Figure 23A:
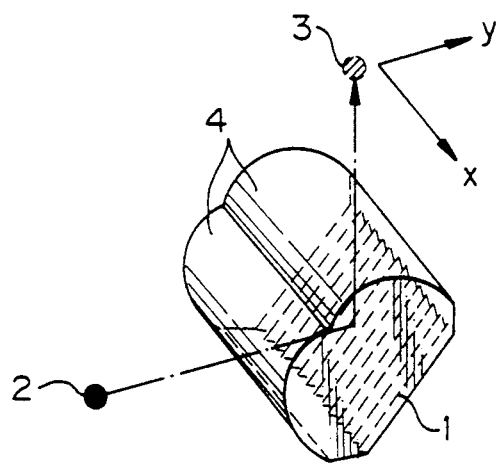
Figure 23B:
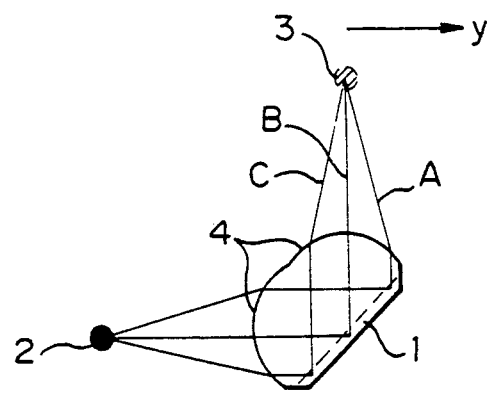
Figure 24:
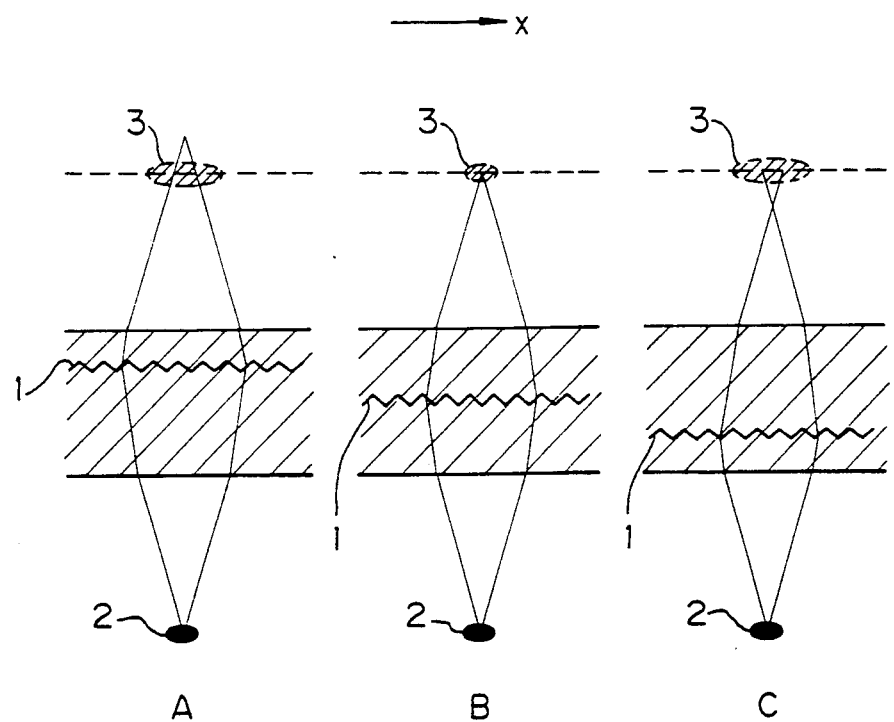
FIG. 24 shows the optical path differences in the object side and the image side due to the incident positions of the reflecting plate.
Figure 25A:
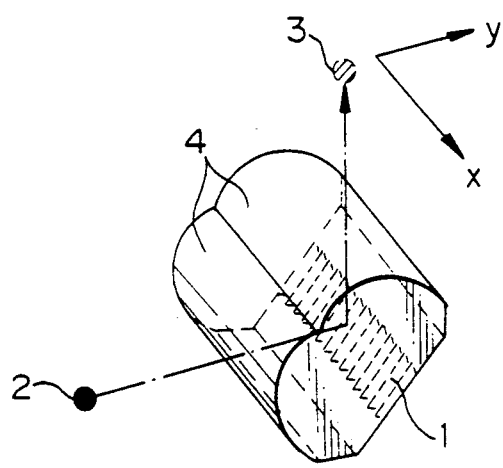
Figure 25B:
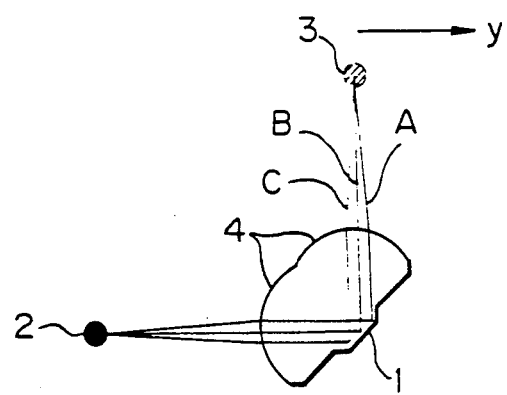

The modification shown in FIGS. 23A an 23B realizes the same function as the device shown in FIGS. 17A and 17B, without using the beam splitter. This is accomplished by increasing the incident angle to the reflecting plate 1. The incident angle is $\pi/4$ in FIGS. 23A and 23B, but when the incident angle to the reflecting plate 1 is large, the difference in the above-mentioned $\gamma$ given by the formula (1) between optical paths at the object side and the image side is increased according to the position of the incidence on the reflecting plate. FIG. 24 shows the differences between the three paths A, B and C shown in FIG. 23B. Although two $\gamma$s of the path B are equal in both the object side and image side, they are different for the paths A and C, and these differences of $\gamma$s lower the image quality. Similarly, these adverse affects occur in the devices shown in FIG. 11A to FIG. 14A, and FIG. 18A, but since the incident angles are not so large, the image qualities are not lowered so much.

Figure 26A:
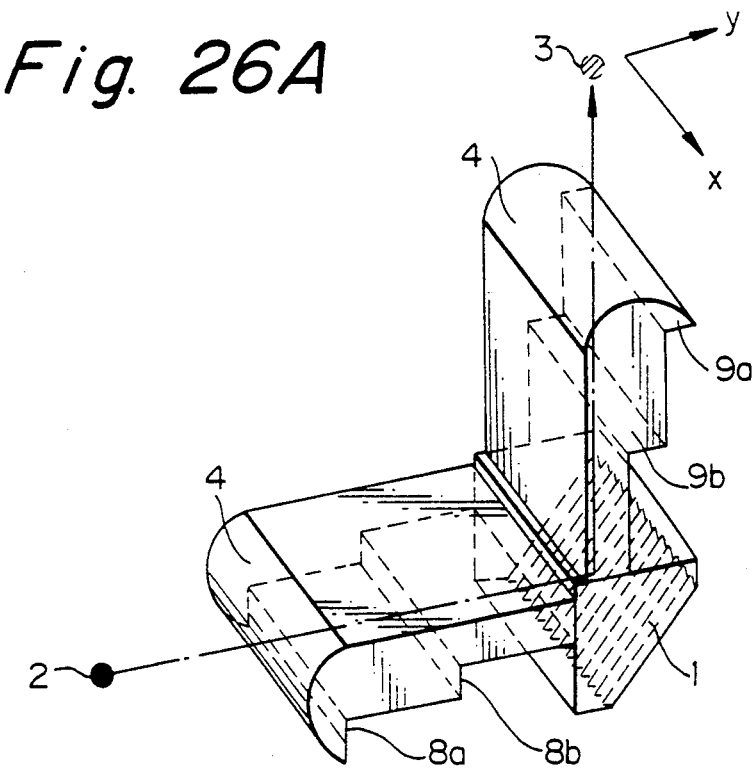
Figure 26B:
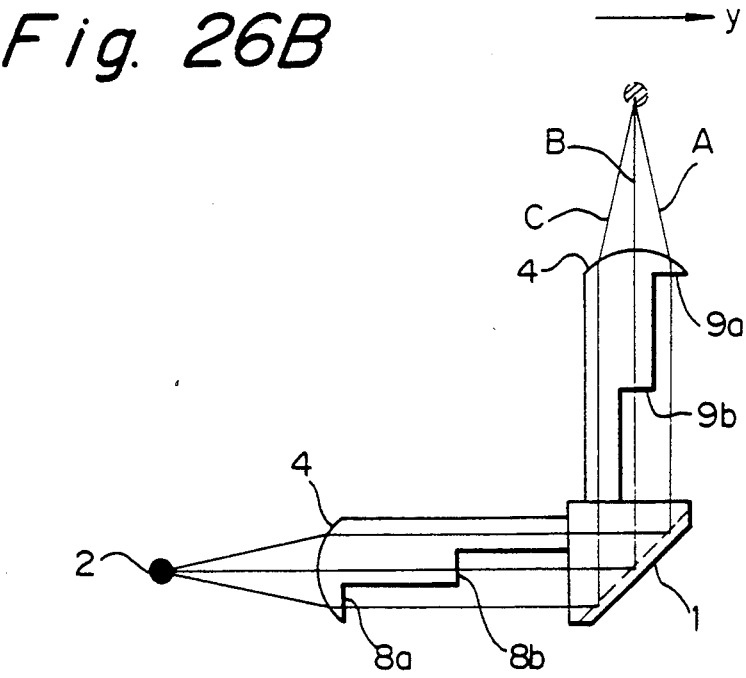

Nevertheless, when the incident angle is large as shown in FIG. 23A, the adverse affects cannot be permitted. FIGS. 25A, 25B and 26A, 26B are examples of how to avoid such adverse affects in the device of FIGS. 23A and 23B. In the modification shown in FIGS. 25A and 25B, the width of the reflecting plate 1 is made smaller, to cut off the optical paths having large differences of $\gamma$s. In the modification shown in FIGS. 26A and 26B, optical elements having different optical paths according to the light passage positions are used for adjusting each optical length. The optical elements are formed of a transparent medium and have different length according to the light passage positions such as 8a, 8b, 9a and 9b. The focusing position can be shifted by arranging a transparent medium 10 in the optical path as shown in FIG. 8. Therefore, each $\gamma$ of the optical paths according to the passing positions can be adjusted by using the elements as shown in FIGS. 26A and 26B.

As described above, the light shield surfaces 7 as shown in FIGS. 9B and 10C can be used for eliminating stray light, but these light shield surfaces 7 can be also used for cutting off light having large incident angles which cause large aberration, by elongating the shield surfaces.

Figure 27:
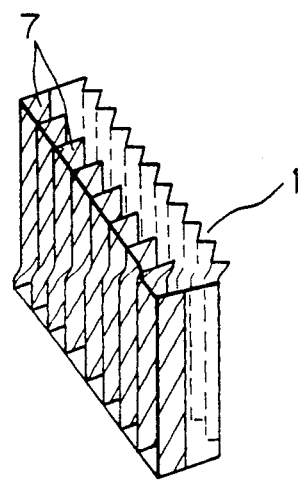
FIG. 27 shows an example of light shield surfaces provided in the reflecting plate.
Figure 28:
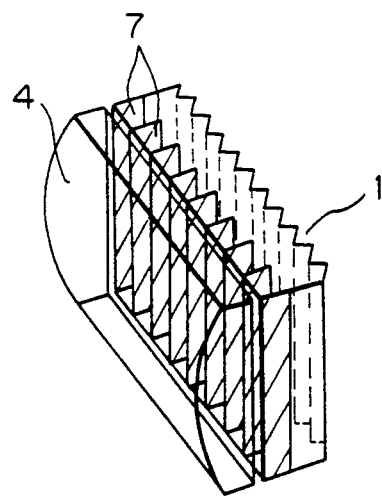
FIG. 28 shows a combination of a cylindrical lens and a reflecting plate shown in FIG. 27.

FIG. 27 shows a modification of the reflecting plate 1 having light shield surfaces 7 per se. FIG. 28 shows an combination of the above reflecting plate and the cylindrical lens 4 arranged directly in front of the reflecting plate.

Modifications of the first embodiment have been explained in the above descriptions, and in those modifications, one or more cylindrical lenses are used for focusing the imaging light component perpendicular to the arrangement direction of pairs of reflecting surfaces. Cylindrical mirrors having a focusing power in the plane perpendicular to the arrangement direction (first direction) also can be used instead of the cylindrical lenses. The surfaces of these cylindrical mirrors have generating lines parallel to the arrangement direction. Further, combinations of cylindrical lenses and cylindrical mirrors also can be used. Compared to a cylindrical lens, a cylindrical mirror has an advantage in that an image produced by a cylindrical mirror does not have a chromatic aberration. Nevertheless, the production of a cylindrical mirror must be more precise than that of a cylindrical lens.

In the following description, modifications of the first embodiment having cylindrical mirrors or combinations of cylindrical lenses and cylindrical mirrors are explained. The degree of freedom of the optical path design can be expanded by using both cylindrical lenses and cylindrical mirrors.

Figure 29:
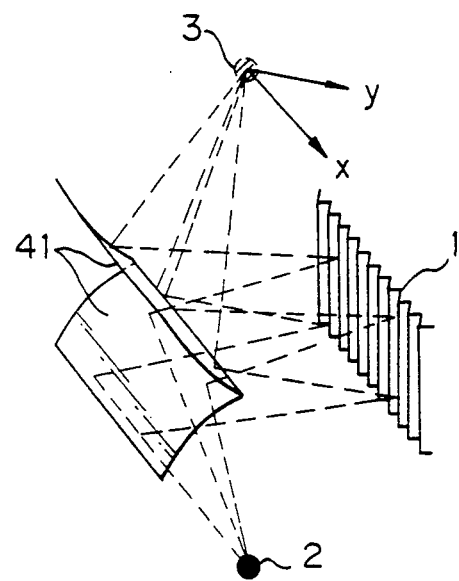
FIG. 29 shows a fundamental construction of the first embodiment, which has cylindrical mirrors and a symmetrical construction opposite a reflecting surface.

FIG. 29 shows a fundamental construction of a optical imaging device according to the first embodiment, having cylindrical mirrors 41. Each cross section of the cylindrical mirrors 41 perpendicular to their own generating lines is a part of parabolic curves focused at the object point 2 or the image point 3, and both cylindrical mirrors 41 are symmetrical to the reflecting plate 1. Therefore, the image projected by the device shown in FIG. 29 has equal-magnifications in both directions.

Figure 30:
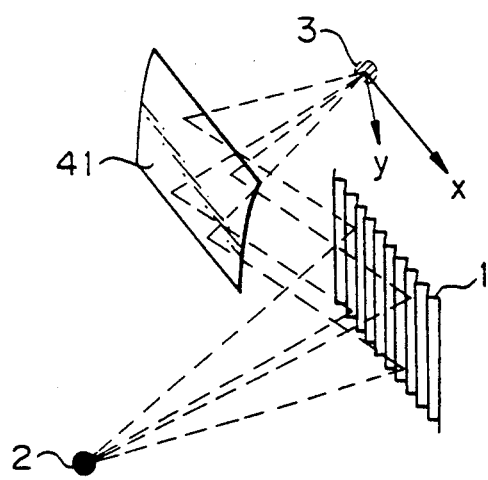
FIG. 30 shows an another fundamental construction of the first embodiment, which has a cylindrical mirror only in the optical path of the image side.

FIG. 30 shows a modification having a cylindrical mirror 41 only in the optical path from the reflecting plate 1 to the image plane. In FIG. 30, the obtained image is reduced in the y direction, which is perpendicular to the arrangement direction of the pairs of reflecting surfaces.

Next, modifications to be applied to practical machines are explained.

Figure 31A:
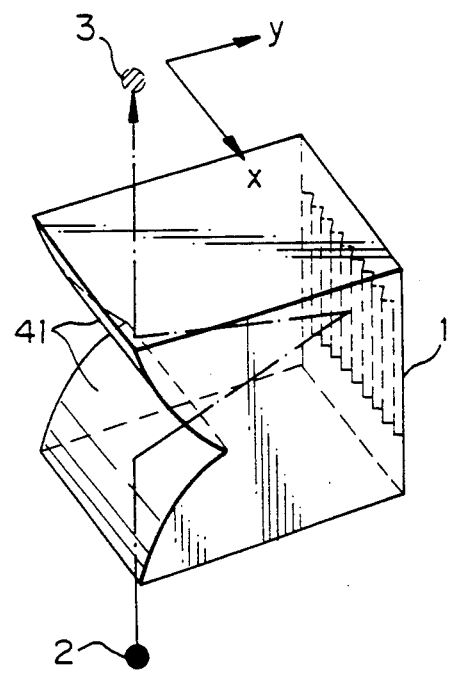
FIGS. 31A, 32A, 33A, 34A, 35A and 36A are perspective views of modifications of the first embodiment having cylindrical mirrors.
Figure 31B:
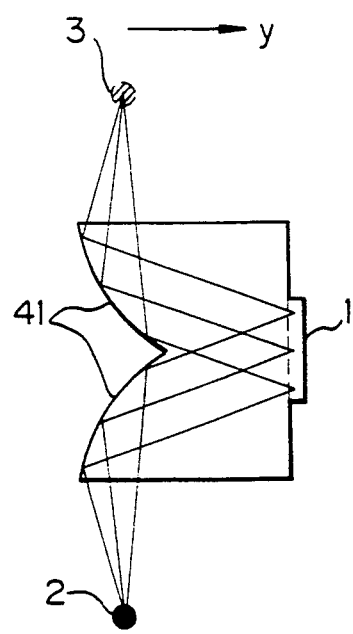
FIGS. 31B, 32B, 33B, 34B, 35B and 36B are cross sectional views of these modifications.

In the modification shown in FIGS. 31A and 31B, two cylindrical mirrors 41 and a reflecting plate 1 are incorporated into a block, and the object plane is parallel to the image plane. The block is a transparent block and can be manufactured by molding. The block projects an image 3 of an object 2 on an image plane. The cylindrical mirrors 41 of the block shown in FIGS. 31A and 31B are symmetrical, and therefore, an obtained image has an equal-magnification in both directions. When the cylindrical mirrors 41 respectively have different focal length, the obtained image is magnified or reduced in the y direction. Nevertheless, the above-mentioned parameter γs must be equal, and therefore, the positions of the cylindrical mirrors relative to the reflecting plate are different.

Figure 32A:
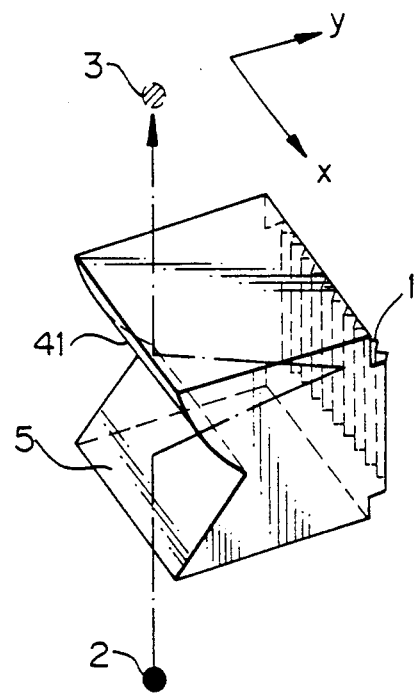
Figure 32B:
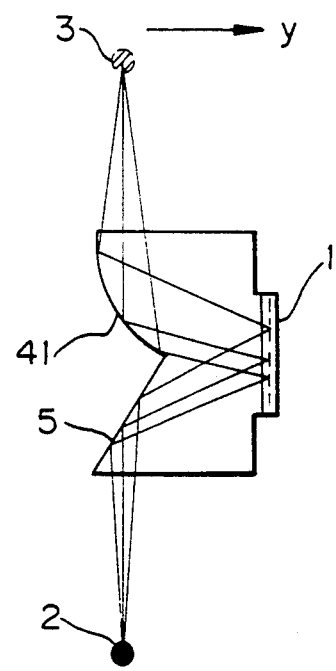

In the modification shown in FIGS. 32A and 32B, a cylindrical mirror 41, a reflecting plate 1 and a folding mirror 5 are incorporated into a block, and the object plane is parallel to the image plane. Since the cylindrical mirror 41 is arranged only in the image side, the obtained image is reduced in the y direction. If the cylindrical mirror 41 and the folding mirror 5 are transposed, a magnified image in the y direction is obtained.

Figure 33A:
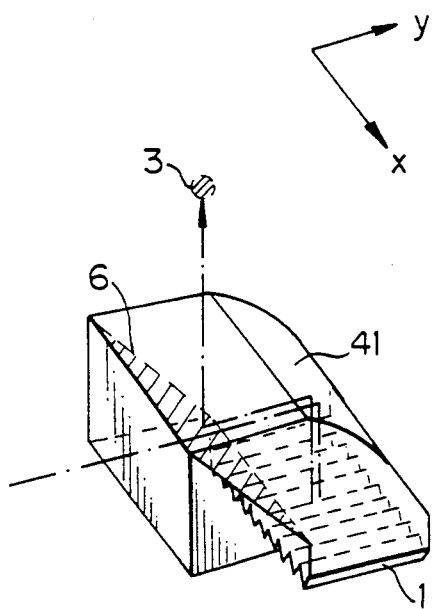
Figure 33B:
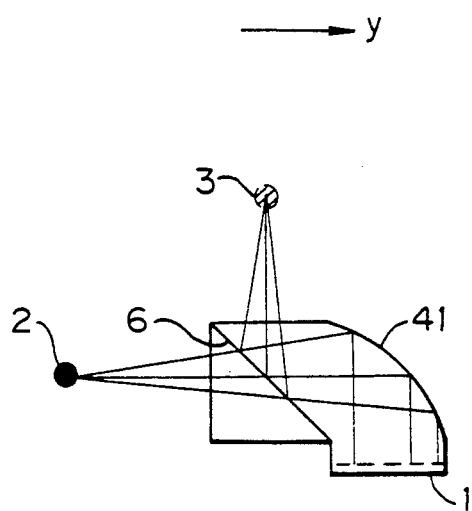
Figure 34A:
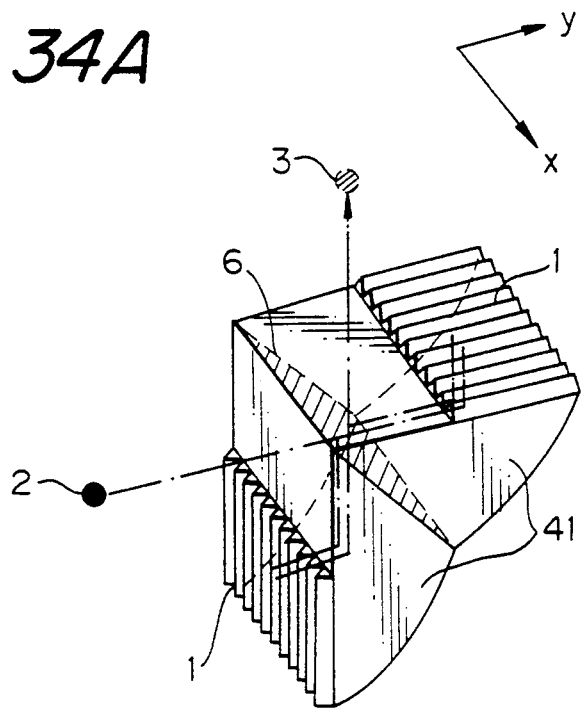
Figure 34B:
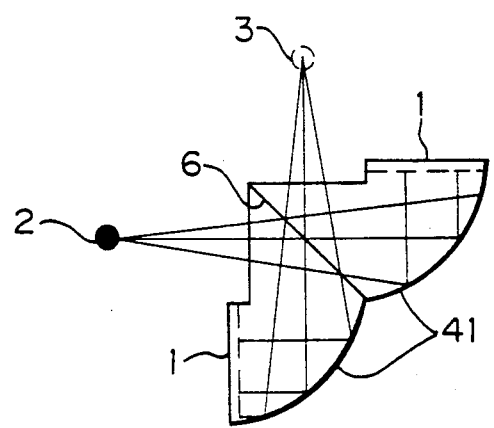
Figure 35A:
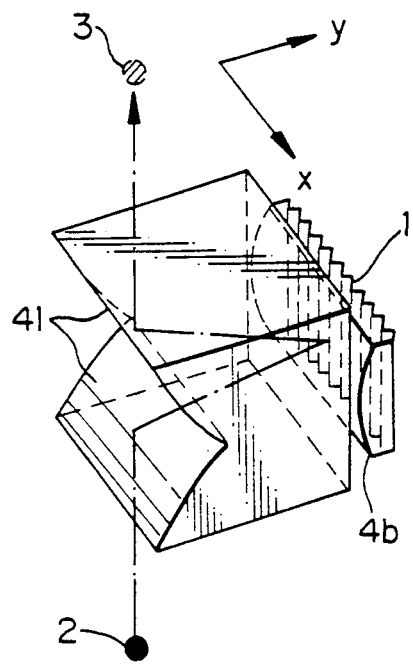
Figure 35B:
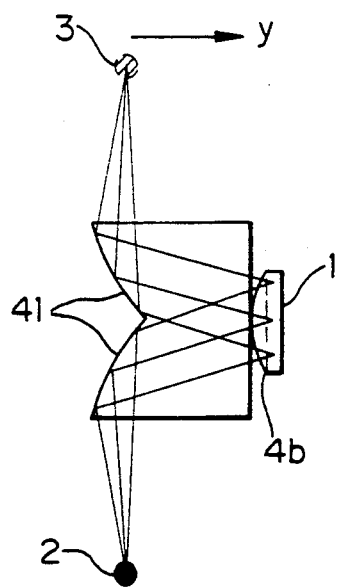
Figure 36A:
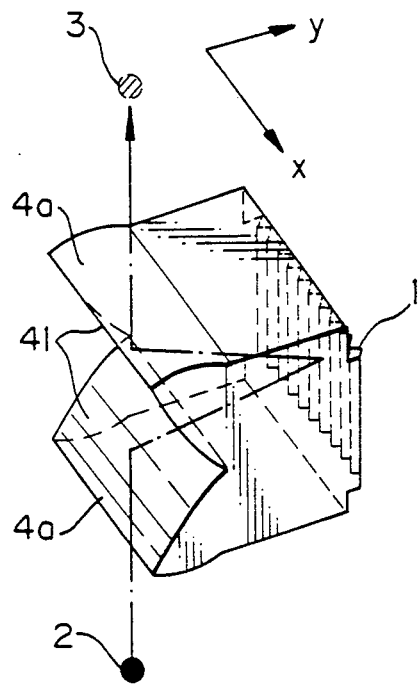
Figure 36B:
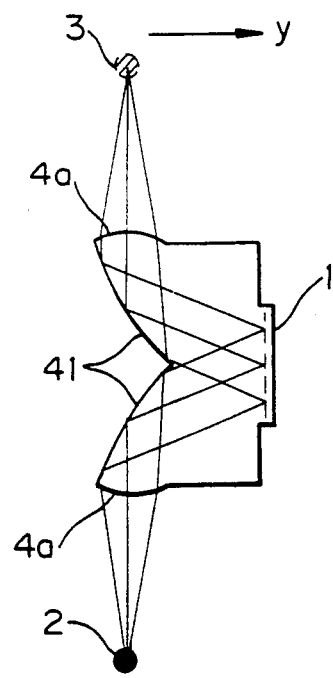

In the modification shown in FIGS. 33A and 33B, a cylindrical mirror 41 and a reflecting plate 1 are incorporated, and a beam splitter having a semitransparent mirror 6 is comprised. The beam splitter divides the imaging light into the object side and the image side. The object plane is perpendicular to the image plane. As described above, when the beam splitter is used as shown in FIGS. 33A and 33B, the ratio of the light focused at the image is less than 25% of the light entering the effective aperture of the device, at a maximum, and therefore, the obtained image of the device shown in FIGS. 33A and 33B is dark. To improve the image brightness, the device as shown in FIGS. 34A and 34B further comprises another reflecting plate. The brightness of the obtained image becomes twice the brightness obtained in FIGS. 33A and 33B.

In FIGS. 35A and 35B, 36A and 36B, modifications of devices having combinations of cylindrical lenses and cylindrical mirrors are shown. One or two cylindrical lenses are added to the construction shown in FIGS. 31A and 31B. Compared to the device shown in FIGS. 31A and 31B, the distance between the object and the image can be reduced in the devices shown in FIGS. 35A, 35B, 36A and 36B. Further, the angular aperture can be increased in the device shown in FIGS. 36A and 36B.

Figure 37A:
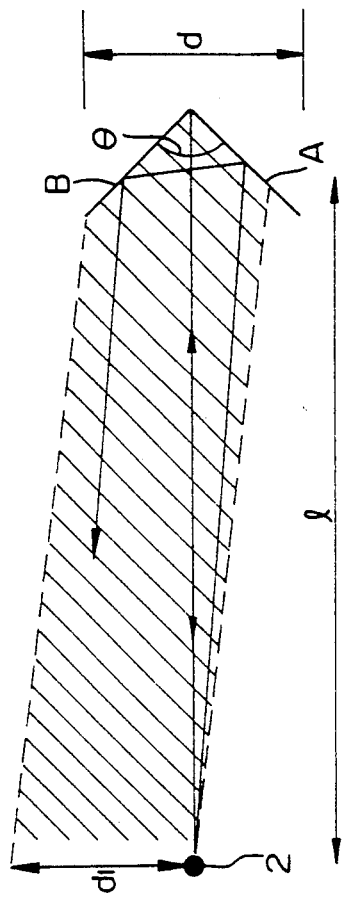
FIGS. 37A, 37B, and 37C show light ray traces which are emitted from a point object and enter a pair of reflecting surfaces, crossing at the angle $\theta$ close to $\pi/2$.
Figure 37B:
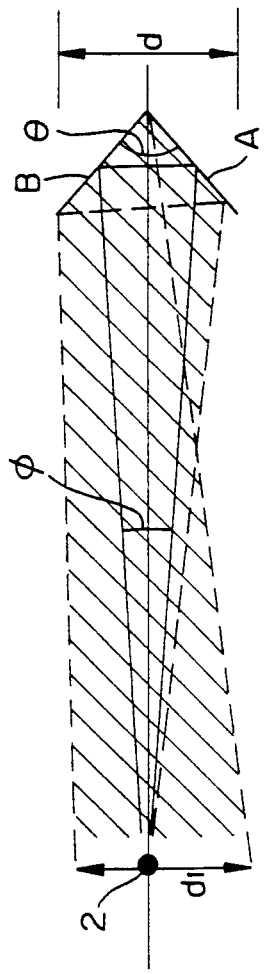
Figure 37C:
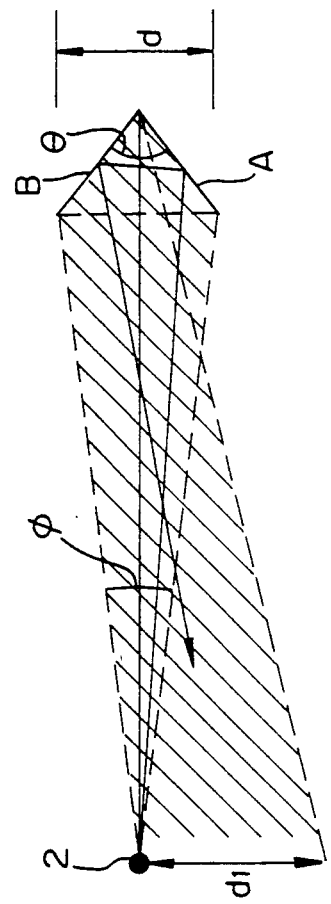

The optical imaging device according to the first embodiment comprises a reflecting plate formed of pairs of reflecting surfaces, and the reflecting surfaces of each pair cross at $\pi/2$ radian. As described above, the resolving power in the arrangement direction of pairs of reflecting surfaces of the obtained image is double the pitch length of each pair of reflecting surfaces. In the second embodiment, the construction is substantially the same as that of the first embodiment, except that each pair of reflecting surfaces cross at the angle $\theta$, which is slightly smaller than $\pi/2$ radian, and thus the resolving power in the arrangement direction is improved. The principle of the improvement of the resolving power is explained with reference to FIGS. 37A to 37C, showing optical paths of the light rays emitted from the point object 2 and first reflected at the surface A, and then reflected at the surface B. The reflecting surfaces A and B cross at the angle $\theta$.

In FIG. 37A, $\theta$ is $\pi/2$ radian and these reflecting light rays are returned within the area of one side of the point object 2. The width of this area is $d_1$. If the distance between the point object 2 and the pair of reflecting surfaces is much longer than the pitch length d of the pair of reflecting surfaces A and B, $d_1$ is nearly equal to d. The light rays first reflected at the surface B at the first time and then reflected at the surface A are returned within the area of another side of the point object 2, and therefore, the image of the point object 2 is fully spread over the area of the width 2d.

In FIG. 37B, $\theta$ is slightly smaller than $\pi/2$ radian, as shown in the following formula;

$$\theta = \pi/2 - \phi/2 \text{ radian}$$

$$\phi = d/(2\ l) \text{ radian}$$

Compared to FIG. 37A, the direction of the light rays reflected at the surface A and then reflected at the surface B is changed to the lower side in the plane of the figure by $\phi$ radian, and therefore, the returning light rays are spread over an area centered at the point object 2. The width of this area is also d. The light rays reflected at the surface B and then reflected at the surface A also spread over the same area, and therefore, the total area of the image of the point object 2 has the width d.

In FIG. 37C, $\theta$ is even more smaller than $\pi/2$ radian, as shown in the following formula;

$$\theta = \pi/2 - \phi/2 \text{ radian}$$

$$\phi = d/l \text{ radian}$$

Light rays reflected at the surface A and then reflected at the surface B are spread over the lower side area of the point object 2, and light rays reflected at the surface B and then reflected at the surface A are spread over the upper side area of the point object 2. Therefore, the total area of the image of the point object 2 has the same width 2d as in FIG. 37A.

Consequently, the range of $\theta$ in which the resolving power can be improved is as follows;

$$\pi/2 - d(2l) < \theta < \pi/2 \quad (2a)$$

Figure 38:
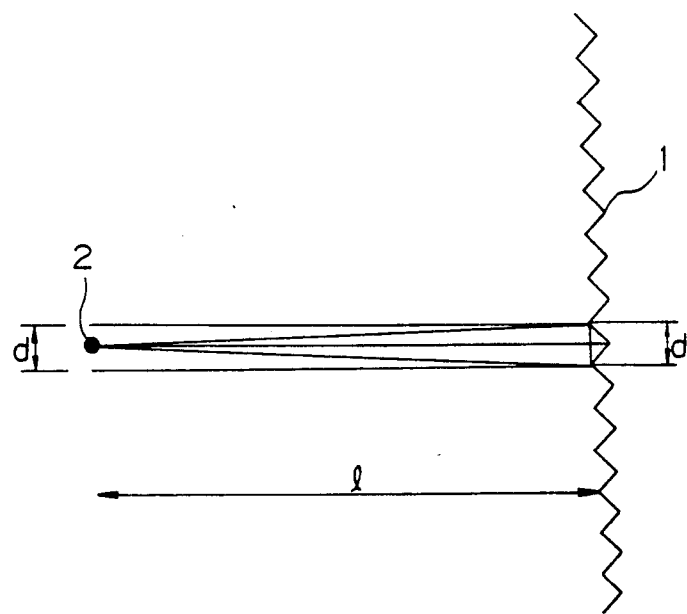
FIG. 38 shows light ray traces which are emitted from a point object and reflected at a reflecting plate having pairs of reflecting surfaces crossing at a particular angle near to $\pi/2$, corresponding to the second embodiment.

FIG. 38 shows the optical path of the light rays reflected by the reflecting plate having the above-mentioned reflecting surfaces. The light rays diagonally entering the reflecting plate are also returned to the same area when the incident angles are relatively small.

The above explanation hold true only when all optical paths are in the same mediums. In practice, other elements such as cylindrical lenses exist, and therefore, when the optical paths pass through the different mediums at respective sides, the above-mentioned formula (2a) which gives the condition of the angle $\theta$, must be adjusted The length of the optical path having different mediums can be generally represented by above-mentioned $\gamma$ given in the formula (1). The above-mentioned formula (2a) can be generalized by using the formula (1) as follows;

$$\pi/2 - \epsilon < \theta < \pi/2 \quad (2)$$

$$\epsilon = d/(2n_0\gamma_0) \quad (3)$$

wherein, d is the pitch length of the pairs of reflecting surfaces, $n_0$ is the refractive index of the medium including the reflecting surfaces of the reflecting plate, $\gamma_0$ is an $\gamma$ of the optical path from the reflecting plate to the object.

As described above, an optical imaging device of second embodiment can have a double resolving power in the arrangement direction comparing to the first embodiment, but although the device of first embodiment can project an image component of the arrangement direction at every position, when $\gamma$s in both sides are equal, the image position of the second embodiment is limited by the angle $\theta$.

The modifications of the first embodiment explained above with reference to the figures can all also applied to the second embodiment.

In the first and second embodiments, each pair of reflecting surfaces is formed by two flat surfaces, and the resolving power in the arrangement direction of the device is determined according to the pitch length of the pairs of reflecting surfaces. Therefore, the pitch length must be short in order to obtain the fine resolving power. As described above, however, the pitch length of the pairs of reflecting surfaces is limited by various factors.

An optical imaging device according to the third embodiment has a construction almost the same as that of the first embodiment shown in FIG. 2 and 7, except that at least one surface of each pair of reflecting surfaces of the reflecting plate is a cylindrical reflecting surface having focusing power in the direction perpendicular to the arrangement direction. The focusing operation of this reflecting plate is described in the following, and is explained as in the plane parallel to the arrangement direction of the pairs of reflecting surfaces.

Figure 39A:
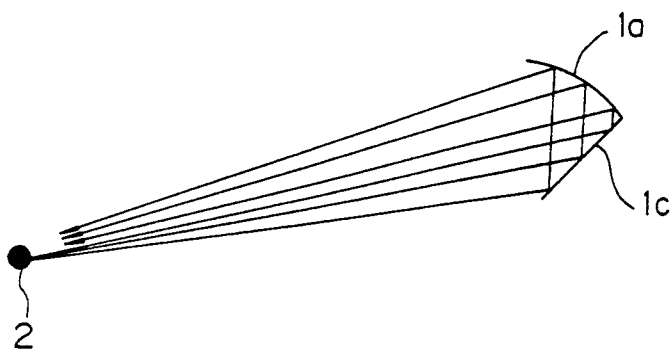
FIG. 39A shows light ray traces which are emitted from a point object and reflected at a pair of reflecting surfaces, one of which is a cylindrical surface corresponding to the third embodiment.
Figure 39B:
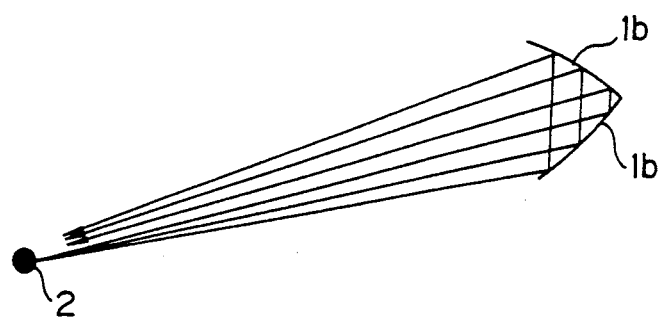
FIG. 39B shows light ray traces which are emitted from a point object and reflected at a pair of reflecting surfaces, which are cylindrical surfaces corresponding to the third embodiment.
Figure 40:
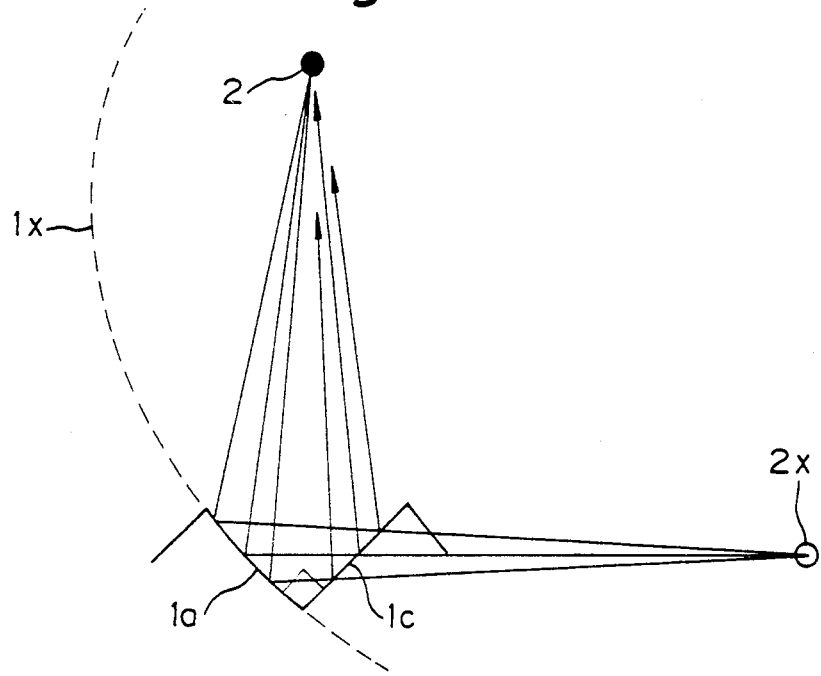
FIG. 40 shows a focusing condition in the pair of reflecting surfaces shown in FIG. 39A.
Figure 41:
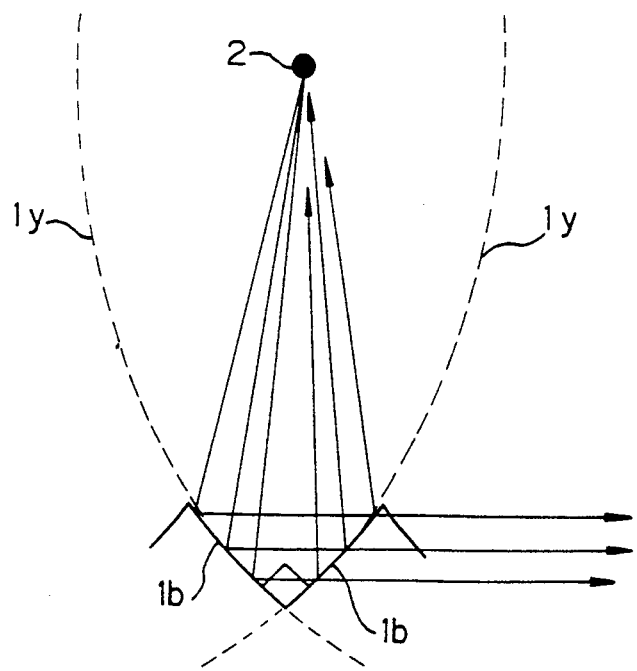
FIG. 41 shows a focusing condition in the pair of reflecting surfaces shown in FIG. 39B.

FIGS. 39A and 39B show light ray traces reflected at the pair of reflecting surfaces. In FIG. 39A, one surface 1a of the reflecting surfaces is a cylindrical surface and the other surface 1c is a flat surface. In FIG. 39B, both of the reflecting surfaces 1b are cylindrical surfaces. Note, when the shapes of the reflecting surfaces are properly determined, light rays from a point object 2 can be focused at the point 2 again. FIGS. 40 and 41 show the shapes of the reflecting surfaces for focusing the image of the point object 2 at the same point.

In FIG. 40, one surface 1a is a part of the ellipse 1x and the other surface 1c is a flat surface. The ellipsoidal surface 1a receives light rays from the point object 2 and projects them onto the image 2x. These light rays projected onto the image 2x are reflected at the flat surface 1c and focused at the position of the point object 2. Light rays emitted from the point object 2 and reflected at the flat surface 1c travel the same paths in the opposite direction and are again focused at the same position. When the distance between the point object 2 and the reflecting surfaces is longer than the pitch length of pairs of reflecting surfaces, two surfaces 1a and 1c cross at almost a right angle.

In FIG. 41, both reflecting surfaces 1b are symmetrical and are parts of the parabolic surfaces 1y. The focus of each parabolic surface 1y is the point object 2, and light rays from the point object 2 are respectively reflected and collimated by the surfaces 1b and then reflected and focused by the other surfaces.

FIGS. 40 and 41 are examples only of the shapes of reflecting surfaces, and other combinations thereof can be used. For example, two concave surfaces having different curvatures can be used.

The pair of reflecting surfaces transmits an erect equal-magnification image. When these pairs of reflecting surfaces are arranged as shown in FIG. 4, each pair of reflecting surfaces projects an erect equal-magnification image in the arrangement direction, and each projected image partially overlaps an adjacent image on the image surface.

When the point object 2 is not at the focus of each of the ellipsoidal surfaces or the parabolic surfaces in FIGS. 40 and 41, the focused image has aberrations, but these aberrations are not large when the off-axis length from the center are shorter. As described above, when light rays have large incident angles to the reflecting plate, a large part of the incident light rays is not reflected in the same direction and becomes stray light rays. Therefore, light rays having large incident angles do not contribute to the image formation and the aberrations of the focused image are not large.

Compared to first and second embodiment, an optical imaging device of third embodiment precisely focused an image component in the arrangement direction, and therefore, the resolving power of the device is not influenced by the pitch length of pairs of reflecting surfaces. Nevertheless, since the total image is formed by overlapping respective images of pairs of reflecting surfaces the pitch length must be small, in order to reduce irregularities of the brightness distribution.

As described above, stray light can be reduced by using the light shield surfaces shown in FIGS. 9B and 10B, and the molded prism array using the total reflection also effectively reduces the stray light.

In the optical imaging device according to the third embodiment, the image component perpendicular to the arrangement direction is also focused by cylindrical lenses, cylindrical mirrors or combinations thereof. Namely, the optical imaging device of third embodiment transmits an image having a strip area, and an image component parallel to the arrangement direction is focused by the reflecting plate having pairs of small cylindrical reflecting surfaces and the image component perpendicular to the arrangement direction is focused by the cylindrical focusing means. The modifications explained in the first embodiment description with reference to the figures can be also applied to the third embodiment.

Although the reflecting plate having pairs of reflecting surfaces projects the image component parallel to the arrangement direction of the pairs of reflecting surfaces in the above-mentioned first to third embodiments, the image component parallel to the arrangement direction is focused by the combination of the reflecting plate and cylindrical lenses in the fourth embodiment. All these cylindrical lenses have the same focusing powers in the direction parallel to the arrangement direction, and are arranged directly in front of the reflecting plate.

Figure 42:
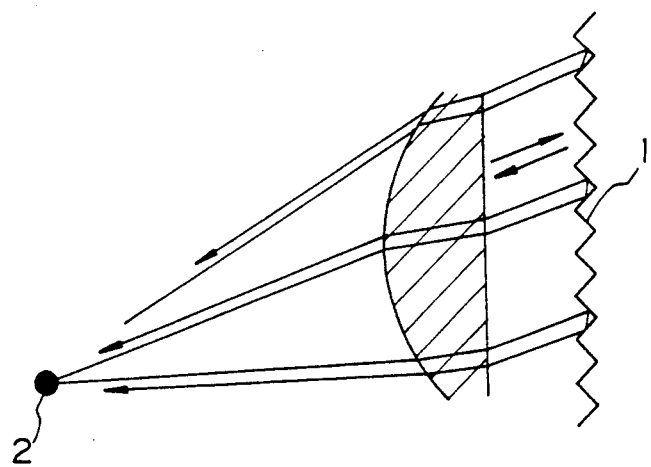
FIG. 42 shows light ray traces which are emitted from a point object and enter a combination of a reflecting plate and a first cylindrical lens.

The reflecting plate according to the fourth embodiment is composed of pairs of flat reflecting surfaces which cross at the $\pi/2$ radian. As shown in FIGS. 3 and 4, the light rays entering the reflecting plate are returned in the opposite direction, and therefore, when a cylindrical lens is arranged directly in front of the reflecting plate 1 as shown in FIG. 42, and the point object 2 is on the focal plane of the cylindrical lens, light rays from the object 2 are changed to parallel light rays after passing through the cylindrical lens, and these parallel light rays then enter the reflecting plate and are returned in the opposite direction. These reflecting light rays are again focused at the position 2, and consequently, a combination of the cylindrical lens and the reflecting plate projects an erect equal-magnification image in the arrangement direction.

Figure 43:
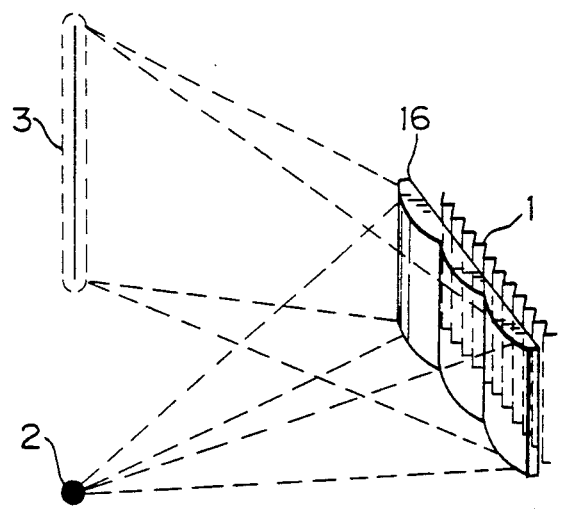
FIG. 43 shows light ray traces, in three dimensions, which are emitted from a point object and enter a combination of a reflecting plate and a first cylindrical lens array.

The device of fourth embodiment, as shown in FIG. 43, comprises a plurality of cylindrical lenses 16 arranged parallel to the reflecting surfaces 1, and each image projected by the combinations of cylindrical lenses and the reflecting plate partially overlaps an adjacent image. Consequently, the reflecting plate 1 and the cylindrical lenses 16 receive light rays from the object 2 and focus them at the line image 3. In the following, these arranged cylindrical lenses are designated as a first cylindrical lens array.

Similar to the previous embodiment, a cylindrical focusing means is used to project the image component perpendicular to the arrangement direction, and is designated as the second cylindrical focusing means in the following.

Namely, the optical imaging device of the fourth embodiment, the combinations of the reflecting plate and the first cylindrical lens array project the image component parallel to the arrangement direction, and the second cylindrical focusing means projects the image component perpendicular to the arrangement direction.

Figure 44:
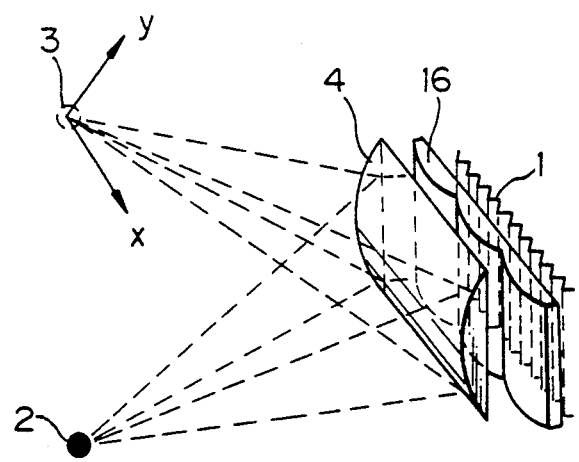
FIG. 44 shows a fundamental construction of the fourth embodiment, in which a cylindrical lenses is used as second cylindrical focusing means, and has a symmetrical construction opposite a reflecting surface.

FIG. 44 shows a fundamental construction of the optical imaging device according to the fourth embodiment, wherein a point object 2 and an image 3 are on both focal planes of a cylindrical lens 4 and respective cylindrical lenses of a cylindrical lens array 16. In FIG. 44, the point object 2 and the image 3 are at symmetrical positions relative to the focusing means such as the cylindrical lens 4, the cylindrical lens array 6 and the reflecting plate, and therefore, the projected image 3 is an equal-magnification image in both directions and is erect in the arrangement direction (x direction) and inverted in the other direction (y direction).

Figure 45:
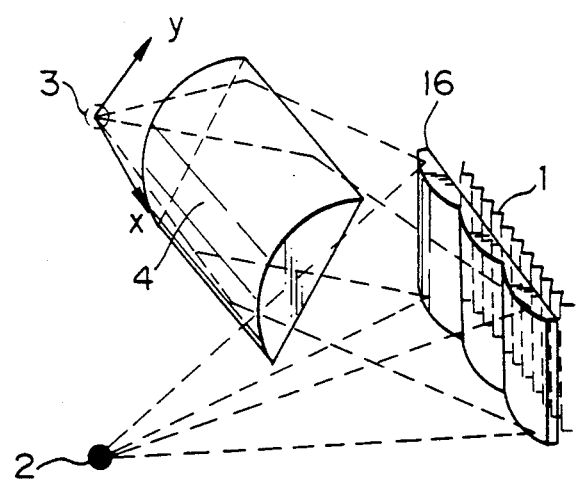
FIG. 45 shows an another fundamental construction of the fourth embodiment, having a construction which is not symmetrical opposite to a reflecting surface.

In the device shown in FIG. 44, the combination of the reflecting plate 1 and the first cylindrical lens array must project the erect equal-magnification image for an image overlapping, but in the y direction, the projected image can be at other magnifications. FIG. 45 shows an above example of a reduced image in the y direction. In the construction shown in FIG. 45, the cylindrical lens 4 is arranged in the optical path from the combination of the reflecting plate 1 and the cylindrical lens array 6 to the image 3. The above-mentioned $\gamma$s of both optical paths in the object side and the image side must be equal, and if the cylindrical lens 4 is arranged in the optical path in the image side in FIG. 45, a magnified image is obtained.

As described above, in the applications to machines, an erect equal-magnification image is required in many cases, and therefore, the symmetrical construction as shown in FIG. 44 is useful because it is easy to design and produce.

As shown in FIG. 9A, light rays reflected at only one surface of each pair of reflecting plates become stray light and lowers the image contrast. The construction having the light shield surfaces for reducing the stray light, as shown in FIGS. 9B, 10C, 27 and 28, is also effective in this embodiment.

Figure 46:
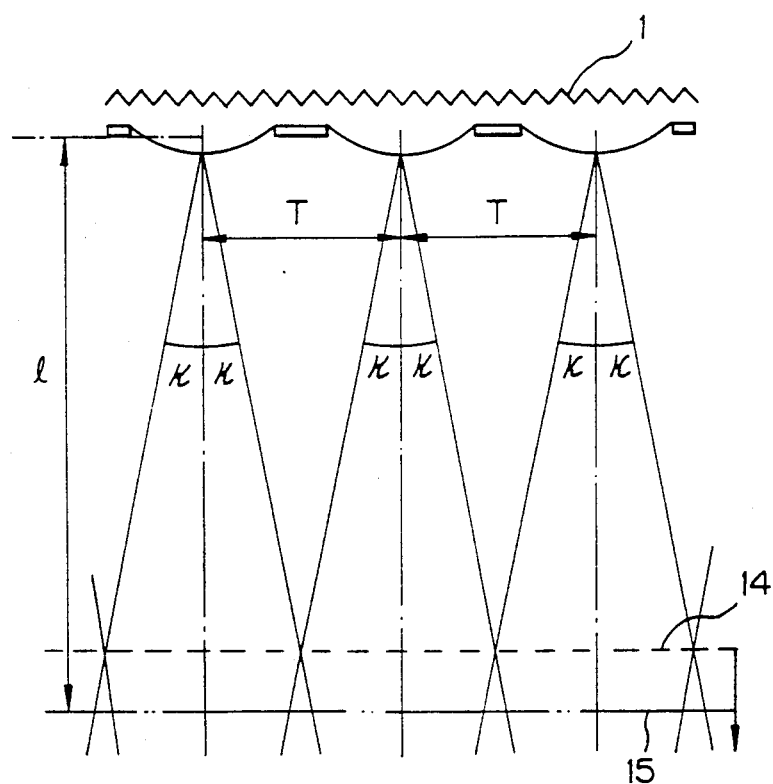
FIG. 46 shows an overlapping appearance of respective image fields of first cylindrical lenses.

As described above, when a reflecting plate is formed of prisms using the total reflection, light rays enter a reflecting plate only at angles less than $\kappa$ given by the formula (5). Therefore, when the first cylindrical lens array is combined with the reflecting plate, the projectable field area of each first cylindrical lens is limited. FIG. 46 shows the range projected by the first cylindrical lens array and the reflecting plate. In FIG. 46, the first cylindrical lens array and the reflecting plate are incorporated, and the pitch length of the arranged first cylindrical lenses is T. Cylindrical lenses respectively cover the image areas within the angle $\kappa$, and each area overlaps the adjacent areas in a range farther than a line 14. Therefore, when the image plane (object plane) is within the line 14 from the cylindrical lens surface, there are areas in which no image areas overlap, those areas receive no light rays and very dark, and consequently, the light distribution on the image plane varies with the period T. The image plane must be farther from the surface of the cylindrical lens array than the line 14. Namely, the distance l between the surface of the cylindrical lens array and the image plane must satisfy the following formula;

$$2l \tan \kappa \geq T \qquad (8)$$

When the inner total reflection of a mold prism array is used, the above-mentioned light variation having the period T is easily produced, even though the image plane is farther than the line 14, and therefore, the pitch length T of the first cylindrical lens arrangement must be carefully determined according to the distance between the image and the first cylindrical lens array 1. If the reflecting surfaces of the reflecting plate are changed from the total reflection prisms to the metal deposited mirrors, the above-mentioned light variation can be reduced, but the image aberrations are increased by an increase the field angle. Therefore, preferably the light variation is reduced by shortening the pitch length of the first cylindrical lenses.

When an optical imaging device according to the fourth embodiment is applied to practical machines, many modifications can be made thereto, and these modifications are explained in the following.

Figure 47A:
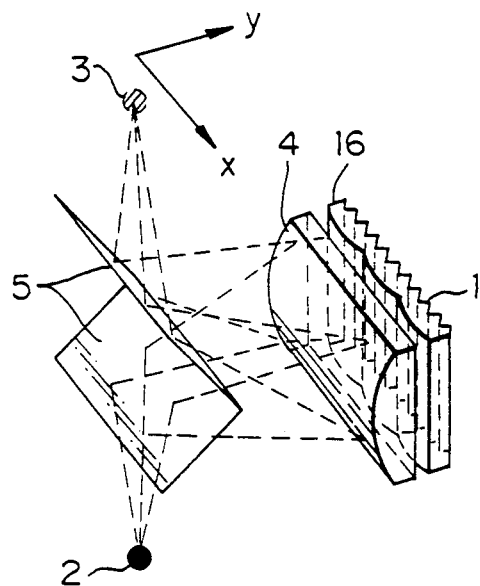
FIGS. 47A, 48A, 49A, 50A, 51A, 52A, 53A, 54A, 55A, 56A, 58A, 59A, 60A, 61A and 62A are perspective views of modifications of the fourth embodiment.
Figure 47B:
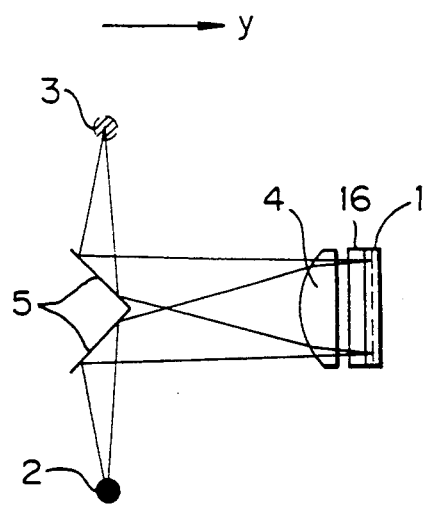
FIGS. 47B, 48B, 49B, 50B, 51B, 52B, 53B, 54B, 55B, 56B, 58B, 59B, 60B, 61B and 62B are cross sectional views of these modifications.

In the modification shown in FIGS. 47A and 47B, an array of a first cylindrical lens 16 and a reflecting plate 1 are incorporated. Further, this modification comprises a second cylindrical lens 4 and two folding mirror 5 for parallelizing an object plane and an image plane. The image area is a strip having a long axis in the x direction, and the image 3 of the point object 2 is obtained at the position shown in FIG. 47A. The obtained image is an equal-magnification image in the x and y directions.

Figure 48A:
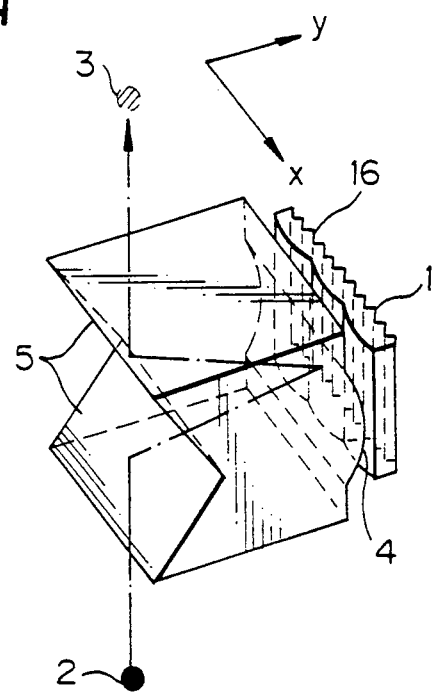
Figure 48B:
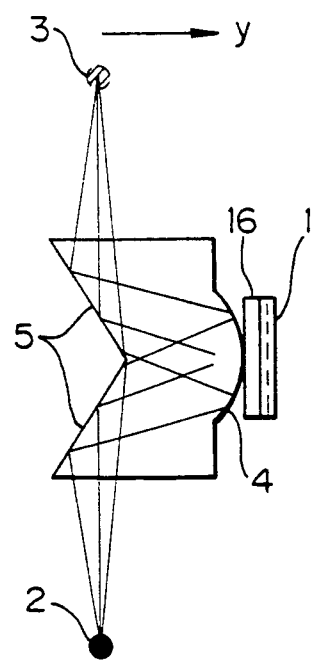

In the modification shown in FIGS. 48A and 48B, a second cylindrical lens 4 and two folding mirrors 5 are further incorporated.

Figure 49A:
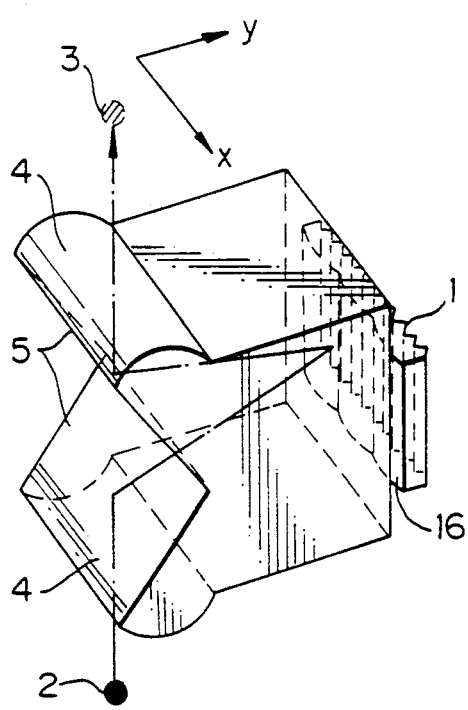
Figure 49B:
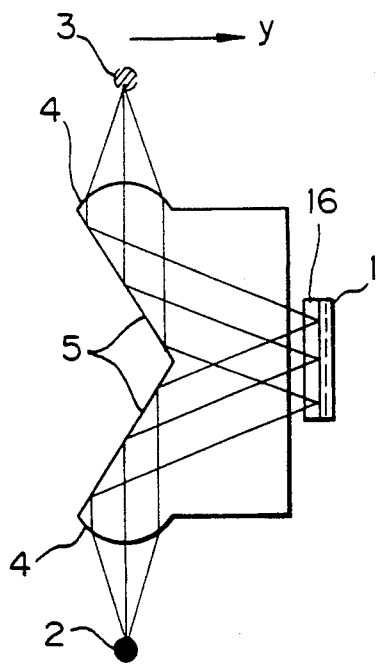

In the modification shown in FIGS. 49A and 49B, two cylindrical lenses 4 and two folding mirrors 5 are incorporated. The object surface and the image surface are also parallel. When both cylindrical surfaces which respectively perform the functions of the cylindrical lens 4, are the same, an equal-magnification image is obtained in both directions. If the cylindrical surfaces 4 are different, an obtained image can be magnified or reduced in the y direction. This is commonly possible in the following examples.

Figure 50A:
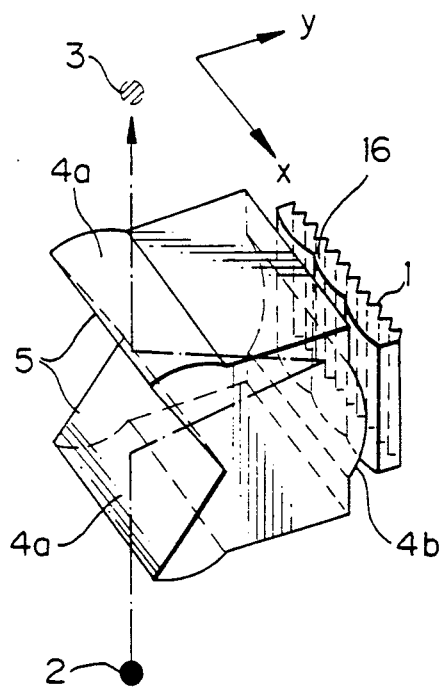
Figure 50B:
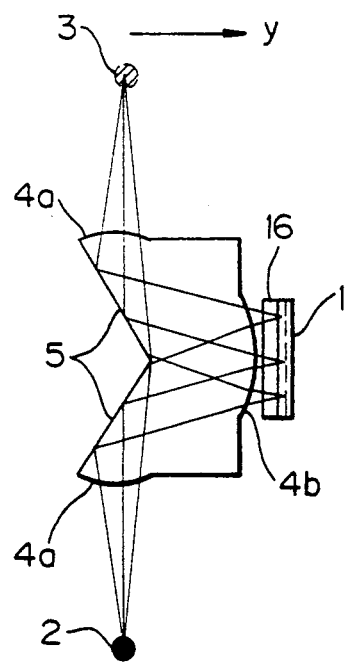
Figure 51A:
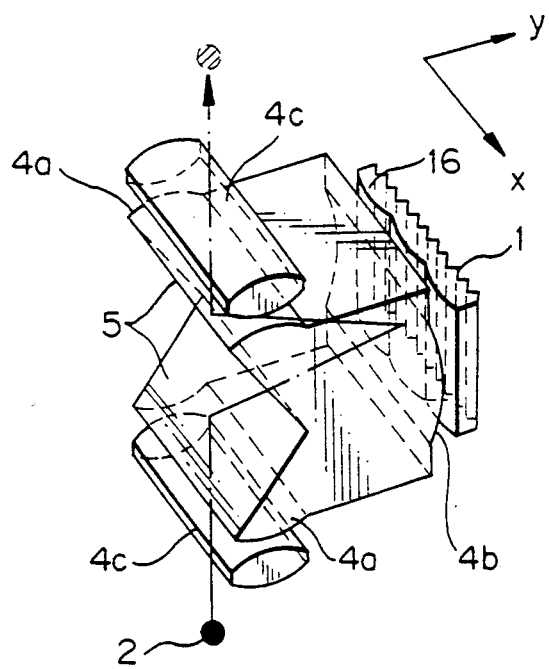
Figure 51B:
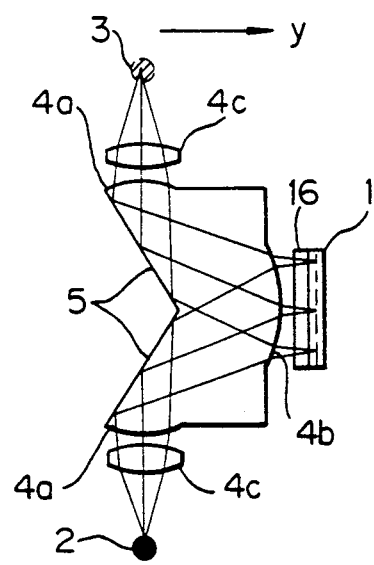

In the modification shown in FIGS. 50A and 50B, three second cylindrical lenses 4a, 4b and two folding mirrors 5 are incorporated, and a reflecting plate 1 and a first cylindrical lens array 16 are also incorporated. The functions of cylindrical lenses 4 shown in FIGS. 49A and 49B are divided into the cylindrical lenses 4a and cylindrical lens 4b, and by dividing the function of the cylindrical lens, the curvature of each of the cylindrical lenses can be made smaller, to thereby make the total aberrations of the device smaller. As shown in FIGS. 51A and 51B, the number of cylindrical lenses can be increased.

Figure 52A:
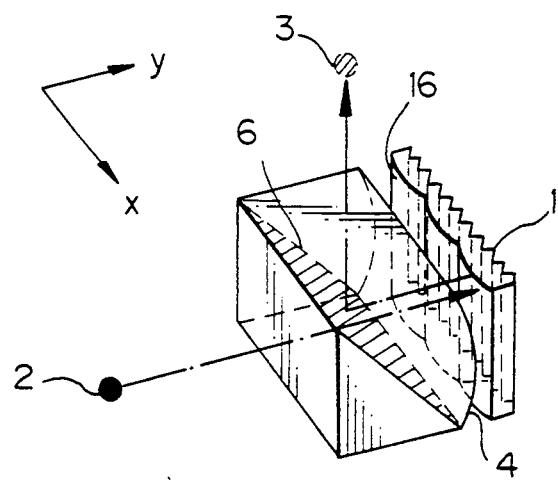
Figure 52B:
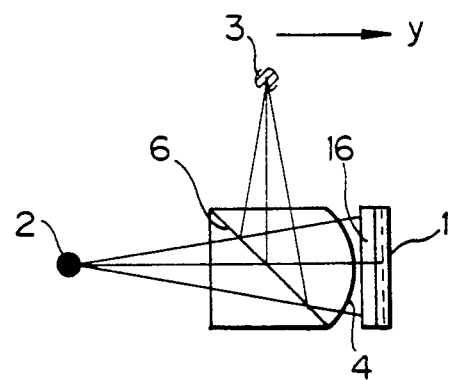

In the modification shown in FIGS. 52A and 52B, a reflecting plate 1 and a first cylindrical lens array 16 are incorporated in the same way as shown in FIGS. 47A and 47B. A beam splitter having a semitransparent mirror 7 is included for dividing optical paths to an object side and an image side. This beam splitter is incorporated with a second cylindrical lens 4. The object surface is perpendicular to the image surface.

Figure 53A:
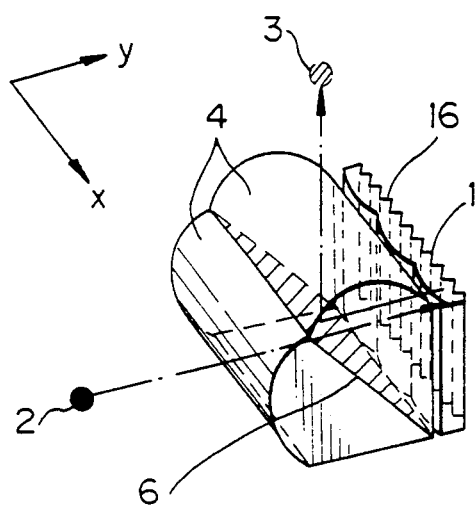
Figure 53B:
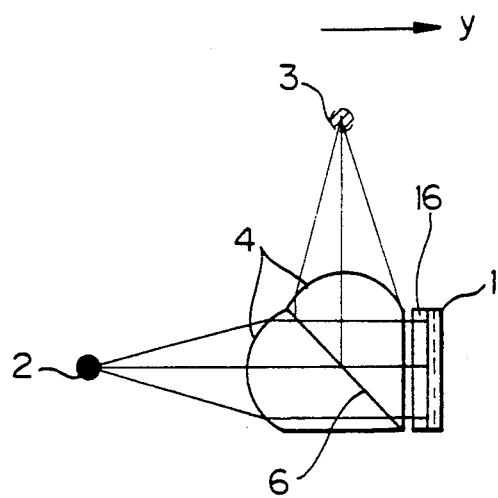
Figure 54A:
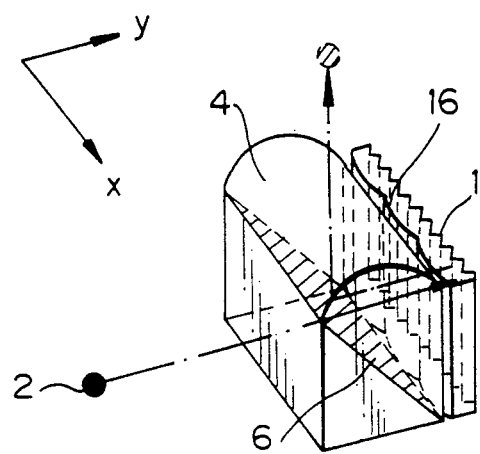
Figure 54B:
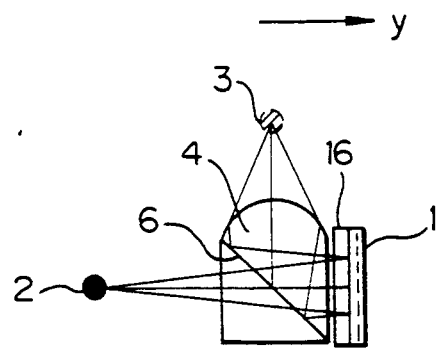
Figure 55A:
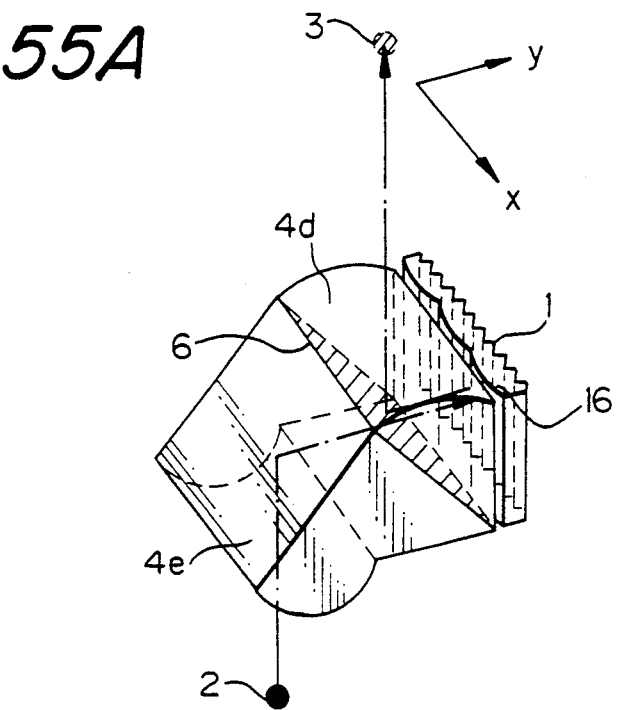
Figure 55B:
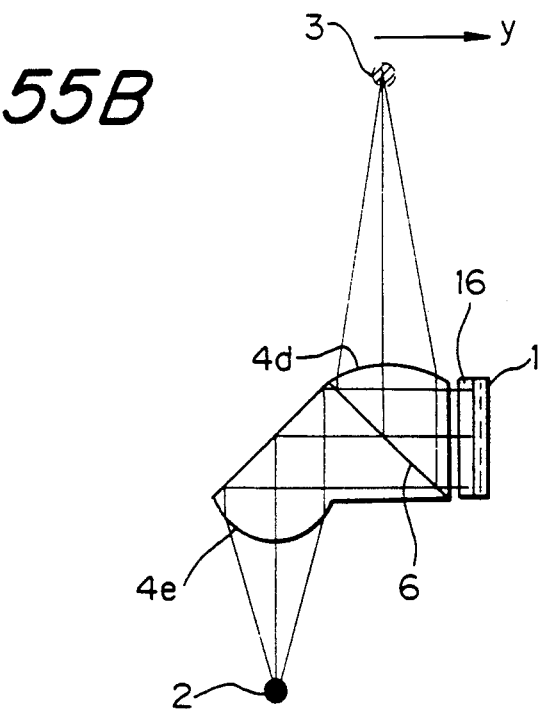

In the modification shown in FIGS. 53A and 53B, two second cylindrical lenses 4 are incorporated with a beam splitter. The function of the second cylindrical lens 4 shown in FIGS. 52A and 52B is divided into two cylindrical lenses in this modifications.

When different cylindrical lenses exist in either of the optical paths from the object to the reflecting plate or from the image to the reflecting plate shown in FIGS. 50A and 53A, the optical imaging device can transmit a magnified or reduced image in the y direction similar to FIG. 49A. The modifications shown in FIGS. 54A, 54B and 55A, 55B realized the above-mentioned function.

Figure 56A:
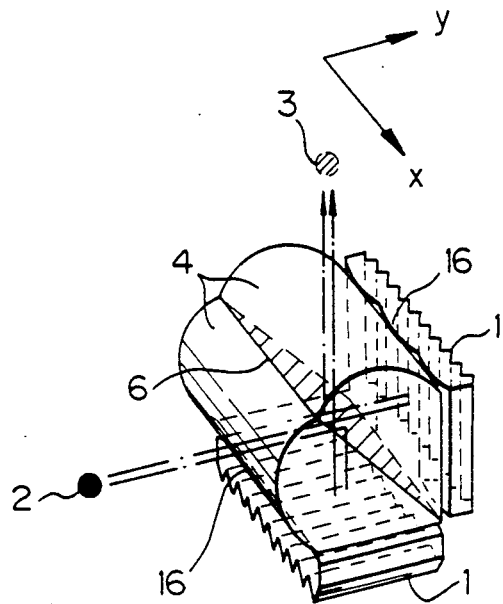
Figure 56B:
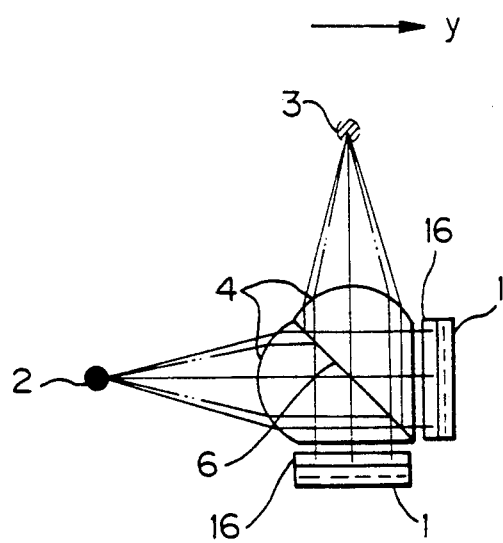

As previously described, when a optical imaging device comprises a beam splitter as shown in FIGS. 52A, 52B, 53A and 53B, the obtained image is dark, and therefore, a modification which projects a bright image is required. A example of this modification is illustrated in FIGS. 56A and 56B. In this modification, a reflecting plate 1 is further added to the optical imaging device shown in FIGS. 53A and 53B, and the image having a double brightness can be obtained, compared to that of the device shown in FIGS. 53A and 53B.

Further, a modification shown in FIG. 22A can be used in this embodiment.

In the modifications shown in FIGS. 49A, 53A and 56A, optical elements such as a beam splitter and folding mirrors are placed neither between the object plane and the cylindrical lens of object side nor between the cylindrical lens of the image side and the image plane and therefore short focal length cylindrical lenses can be used and thus a bright image can be obtained.

When the effective focal length of the cylindrical lenses is short, although a bright image can be obtained, the focal depth becomes short. Conversely, when the effective focal length of the cylindrical lenses is long, although an obtained image becomes dark, the focal depth becomes long. When a focal length cylindrical lens is used, the modifications as shown in FIGS. 47A, 48A and 52A can make the total device more compact.

Figure 57A:
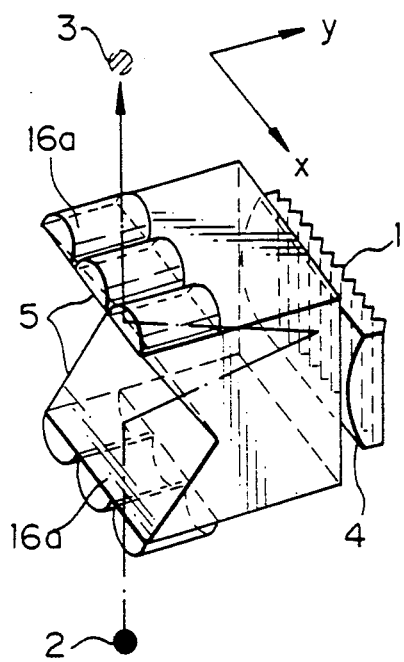
FIG. 57A is an example for comparing the optimum positions of the first cylindrical lens array.
Figure 57B:
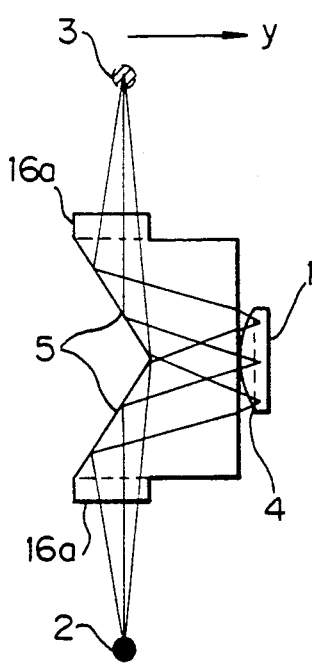
FIG. 57B is a cross sectional view of this modification.

Next, the optimum position of an array of first cylindrical lenses is explained. FIGS. 57A and 57B show an example of positions of an array of a first cylindrical lenses, as a comparison of the optimum position. In the construction as shown in FIGS. 57A and 57B, two arrays of first cylindrical lenses are respectively arranged in both optical paths. Of course, the device shown in FIGS. 57A and 57B can fundamentally project the image, but in practice, it is difficult to adjust each optical axis of the respective cylindrical lenses with the corresponding axis in the other side. Also, since the distances between the arrays of first cylindrical lenses and the reflecting plate are long, the variations of the light distribution on the image plane become large when the optical path length are the same.

Figure 58A:
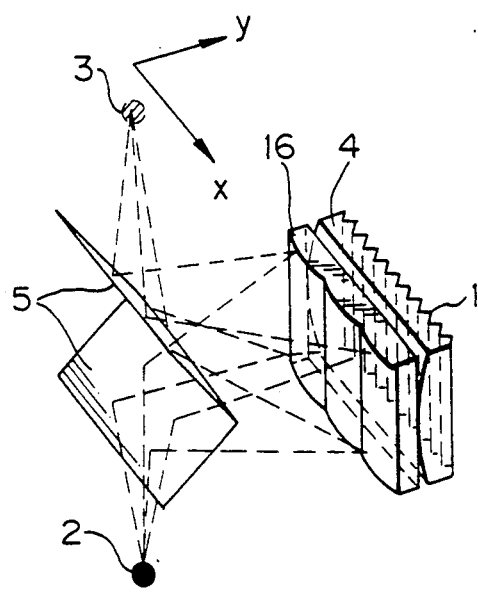
Figure 58B:
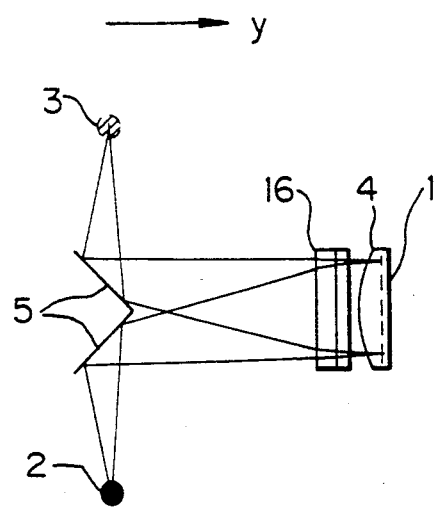

Therefore, a first cylindrical lens array must be commonly arranged in both optical paths at the object side and image side, and arranged directly in front of the reflecting plate. Nevertheless, the arrangement as shown in FIGS. 58A and 58B, in which a second cylindrical lens 4 is arranged between a first cylindrical lens array 16 and a reflecting plate 1, can be used without problems.

In the optical imaging device of the fourth embodiment, cylindrical mirrors can be used instead of the second cylindrical lenses. Examples thereof are illustrated in the following.

Figure 59A:
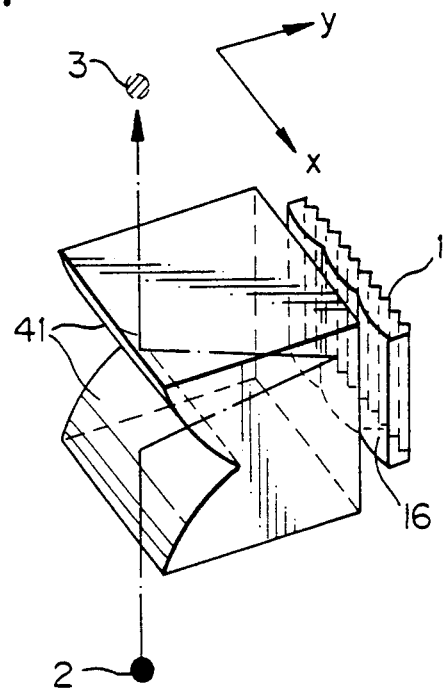
Figure 59B:
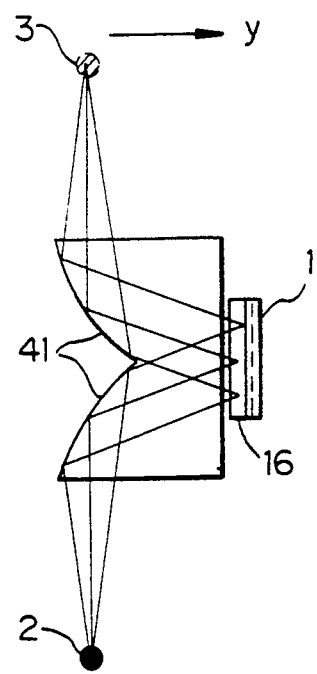
Figure 60A:
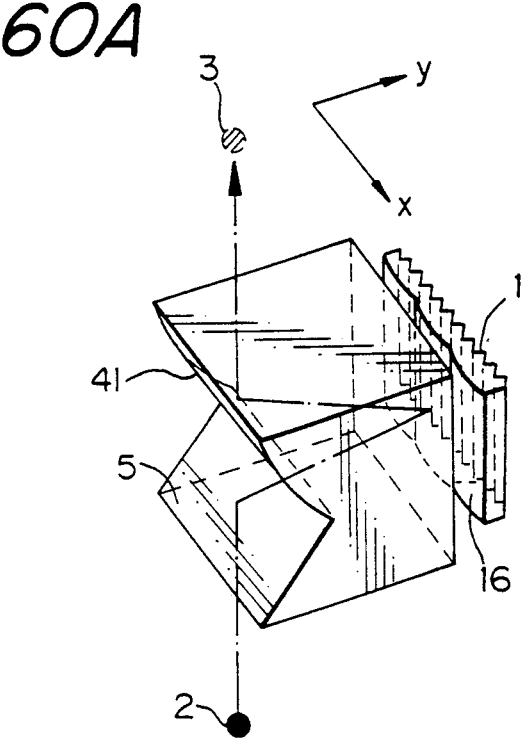
Figure 60B:
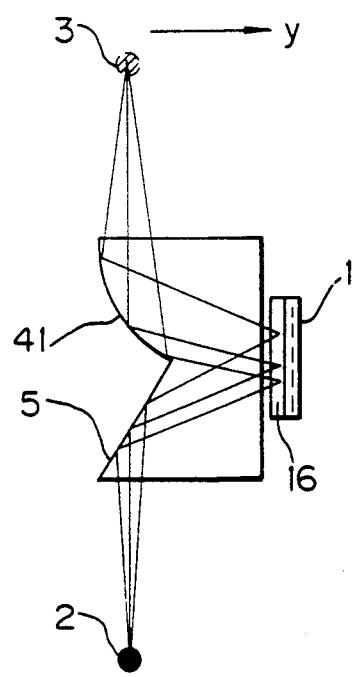

In the modification shown in FIGS. 59A and 59B, second cylindrical mirrors 41 perform the functions of the second cylindrical lens 4 and the folding mirrors 5. When the curvatures of the second cylindrical mirrors 41 are different and the positions are changed according to those curvatures, the obtained image can be magnified or reduced in the y direction. FIGS. 60A and 60B show a particular example in which one of the second cylindrical mirrors is flat. The image obtained in FIGS. 60A and 60B is reduced in the y direction.

Figure 61A:
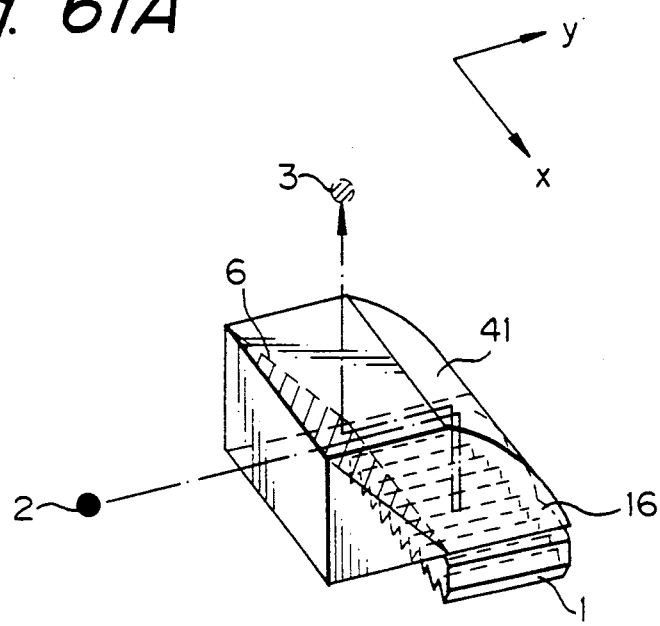
Figure 61B:
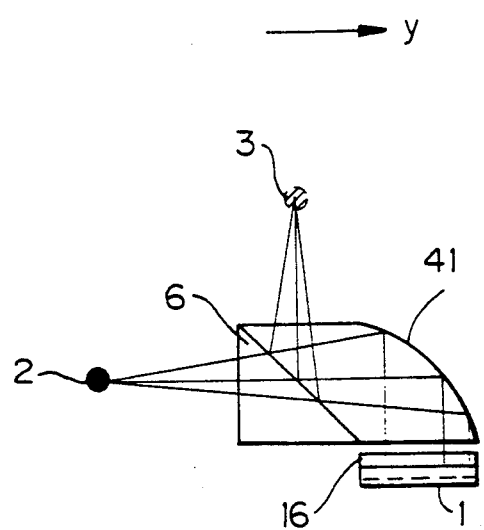

In the modification shown in FIGS. 61A and 61B, a second cylindrical mirror 41 is included. This second cylindrical mirror corresponds to the second cylindrical lens in FIGS. 52A and 52B.

Figure 62A:
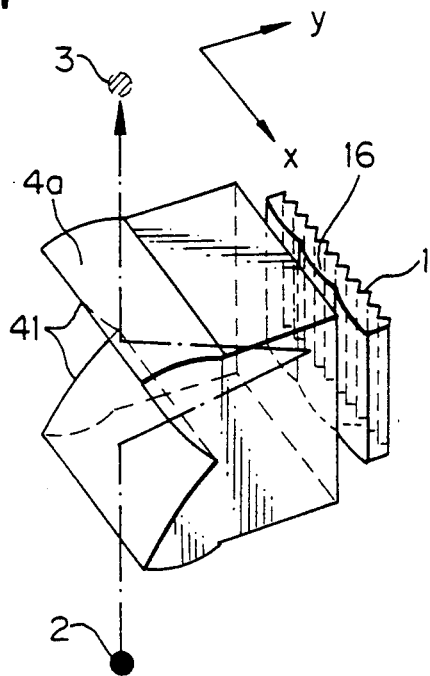
Figure 62B:
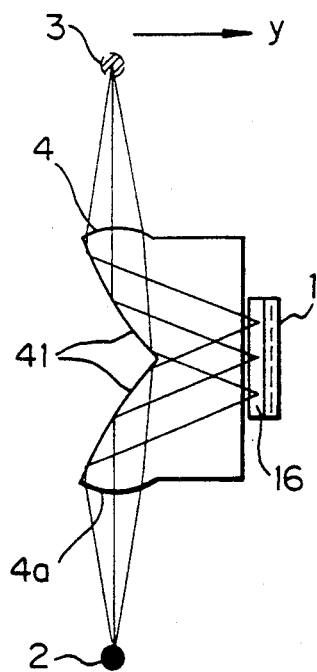

The optical imaging device which comprises second cylindrical mirrors instead of second cylindrical lenses has an advantage in that an obtained image has less chromatic aberrations, but the manufacturing of cylindrical mirrors requires a higher molding precision. The modification shown in FIGS. 62A and 62B comprises two sets of a second cylindrical lens and second cylindrical mirror, and this joint use of cylindrical lenses and cylindrical mirrors enables many variations of the device modifications to be designed.

Now, the correlation between the first cylindrical lens and the pairs of reflecting surfaces of the reflecting plate is explained.

The above correlation has two factors; the difference between the pitch lengths of pairs of reflecting surfaces of the reflecting plate and the pitch length of the first cylindrical lens arrays, and the relative position of the pair of reflecting surfaces and the first cylindrical lens.

Figure 63A:
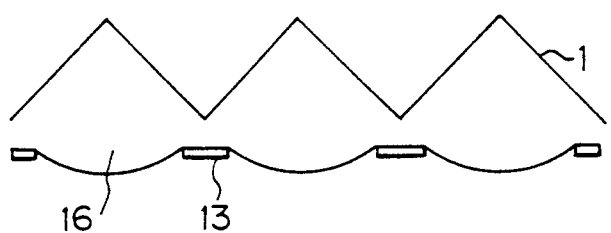
FIGS. 63A, 63B, 63C show the relative conditions of each first cylindrical lens and pairs of reflecting surfaces, in which one first cylindrical lens corresponds to n pairs of reflecting surfaces.

In FIG. 63A, both pitch lengths are the same, and each pair of the reflecting surfaces corresponds to respective cylindrical lens, and the correlation shown in FIG. 63A produces an normal image. Nevertheless, if each axis of the first cylindrical lenses is moved from the respective centers of the pairs of reflecting surfaces, the brightness on the image plane changes very quickly, and no image can be obtained at all when the movement becomes a half pitch. Namely, the brightness variation occurs due to the difference in the axes of the first cylindrical lenses and pairs of reflecting surfaces.

Figure 63B:
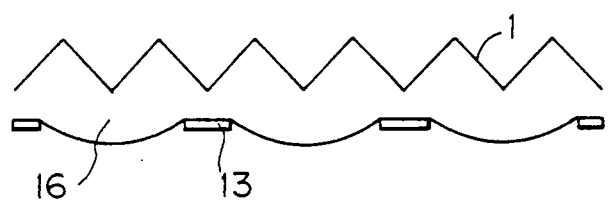

In FIG. 63B, the pitch length of the first cylindrical lens arrangement is double that the pitch length of the pairs of reflecting surfaces. A brightest image can be obtained when the relative position is as shown in FIG. 63B; this brightness is almost the same as the maximum brightness obtained in FIG. 63A. When each axis of first cylindrical lenses is moved a half pitch of the pair of reflecting surfaces, the obtained image becomes very dark, but the difference between the brightest and the darkest conditions is a half of that shown in FIG. 63A.

Figure 63C:
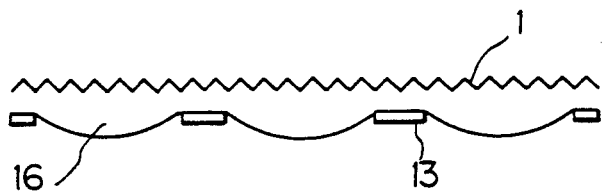

In FIG. 63C, one first cylindrical lens corresponds to many pairs of reflecting surfaces. When one first cylindrical lens corresponds to N pairs of reflecting surfaces, the image brightness variation due to the difference in the axes is 1/N of the maximum brightness. Therefore, when N is large, the image brightness variation due to the difference in the axes can be practically neglected, and the operation for adjusting the axes of the first cylindrical lenses to the centers of respective pairs of reflecting surfaces becomes unnecessary.

When an optical imaging device according to the present invention is applied to machines, the brightness variation on the imaging surface is practically required to be less than about 30%. As described above, the brightness variation can be less than about 30% without adjusting the axes when the pitch length of the first cylindrical lenses is more than triple that of the pitch length of pairs of reflecting surfaces. In practice, this ratio is preferably more than 5 and more preferably more than 10.

In the above, the correlations obtained when the ratio of pitch length of the first cylindrical lens array and the reflecting surface pair array is an integer are explained. Other conditions exist in which even brightness contributions are always produced, and in these conditions, the width W of the first cylindrical lens and the pitch length T satisfy the following formula:

$$W = (N + 0.5)T \tag{9}$$

wherein, N is an integer more than 1.

Figure 64A:
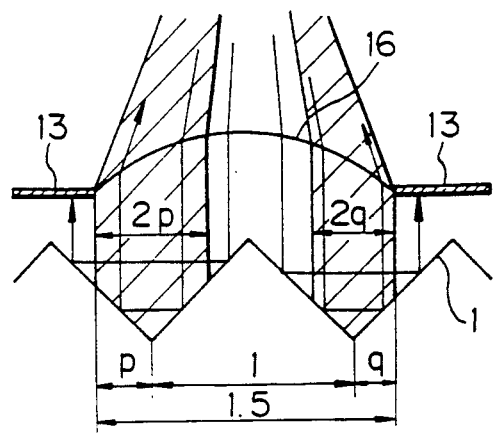
FIGS. 64A, 64B, 64C show light ray trances entering a combination of a first cylindrical lens and a reflecting plate in which the width of each first cylindrical lens corresponds to 1.5 pitch length of each pair of reflecting surfaces.

The principle of these conditions is explained with reference to FIGS. 64A, 64B and 64C, which show three kinds of relative positions of the first cylindrical lens 16 and the pairs of reflecting surfaces. In the figures, the pitch length of the pair of reflecting surfaces is 1. As shown in FIG. 64A, light rays entering the ranges having widths 2P and 2Q in respective pairs of reflecting surfaces can be returned in the opposite directions and become image light rays. The widths P and Q are given in the following formula;

$$P + Q = 0.5 \tag{9}$$

$$\text{Therefore, } 2P + 2Q = 1 \tag{10}$$

Namely the width of the effective aperture of the first cylindrical lens 16 is 1.

Figure 64B:
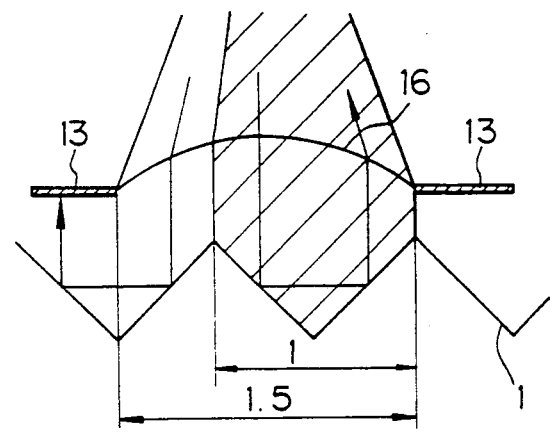
Figure 64C:
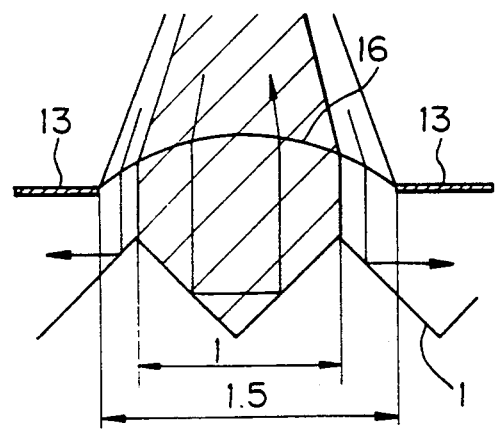

In the states as shown in FIGS. 64B and 64C, all light rays entering one pair of reflecting surfaces can be returned in the opposite directions, and other light rays are not returned. Therefore, the effective apertures shown in FIGS. 64B and 64C are also 1. Consequently, when the correlation of the first cylindrical lens array and the pairs of reflecting surfaces satisfies the above conditions, the effective aperture is always 1 regardless the relative positions, and an adjustment of the relative positions is not required. The above condition can be also satisfied when the integers are other than 1.

Nevertheless, the maximum values of the image brightness obtained in the above conditions are less than obtained in FIG. 63A. In particular, when W is 1.5 T, the obtained brightness is about 30% different to that obtained in FIG. 63A. Further, as shown in FIGS. 64A, 64B and 64C, a light shield means 13 is required on the surface of the first cylindrical lens array, in order to reduce the stray light, and therefore, the effective aperture is smaller. The light shield means can be formed by black paint.

Figure 65:
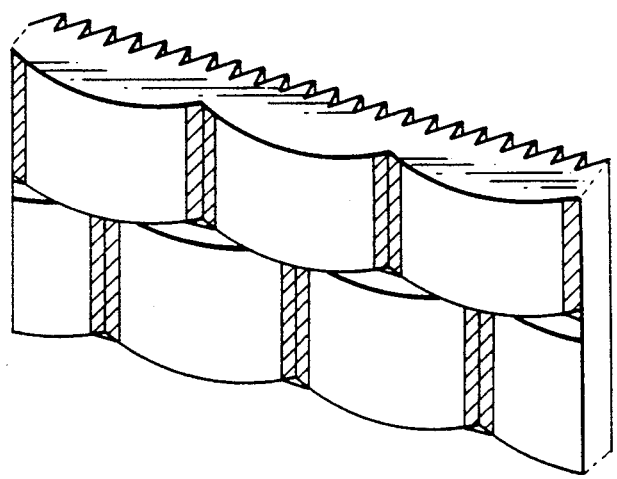
FIG. 65 shows a modification which has two mutually arranged arrays of first cylindrical lens.

The above-mentioned brightness variation on the image surface is due to the positional differences between the first cylindrical lens array and the reflecting plate, but another factors producing the brightness variation on the image plane exist, such as the brightness variations in the fields projected by respective first cylindrical lenses, and the overlapping states of those fields. To reduce these variations, the pitch length of the first cylindrical lens array must be much smaller than the distance between the image plane and the first cylindrical lens array, as this makes the overlapping ratio of the respective fields large. The overlapping ratio can be increased by mutually arranging two first cylindrical lens arrays as shown in FIG. 65. The row number of first cylindrical lens arrays can be more than 3, but the number is preferably even for obtaining the lowest variation.

Figure 66:
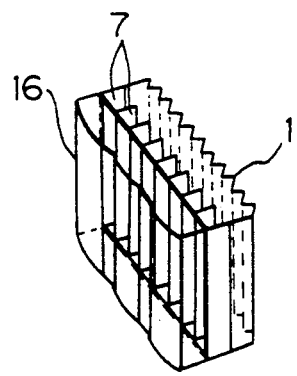
FIG. 66 shows a modification which has light shield surfaces both in the reflecting plate and on the first cylindrical lens array surface.
Figure 67:
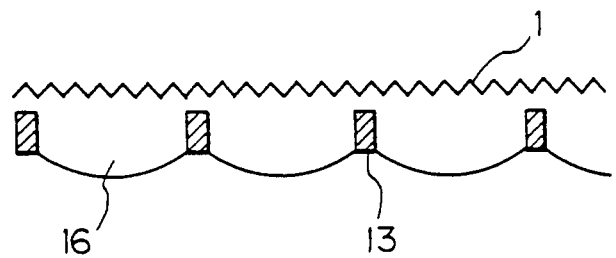
FIG. 67 shows an example of a light shield means extended from the first cylindrical lens surface into the reflecting plate.

As described above, the light shield surfaces can be used for reducing the stray light, and in the present embodiment, a reflecting plate having the light shield surfaces shown in FIG. 27 also can be used. FIG. 66 shows a modification in which light shield surfaces are provided at both the reflecting plate and at the surface of first cylindrical lens array. When the light shield means 13 extends into the first cylindrical lens array as shown in FIG. 67, the light shield means can also perform the function of the light shield surfaces 7.

Figure 68:
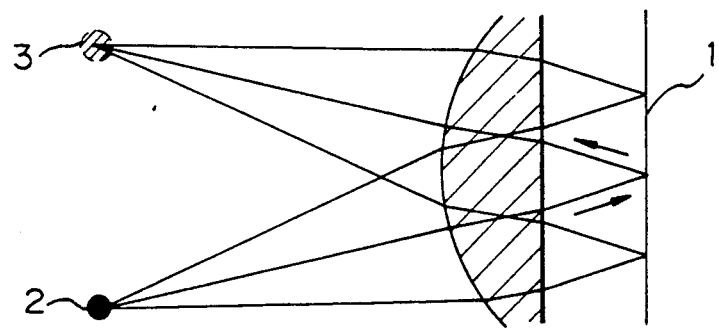
FIG. 68 shows light ray traces in the plane perpendicular to a direction arrangement in which a reflection is obtained by a combination of a convex lens and a reflecting plate.
Figure 69:
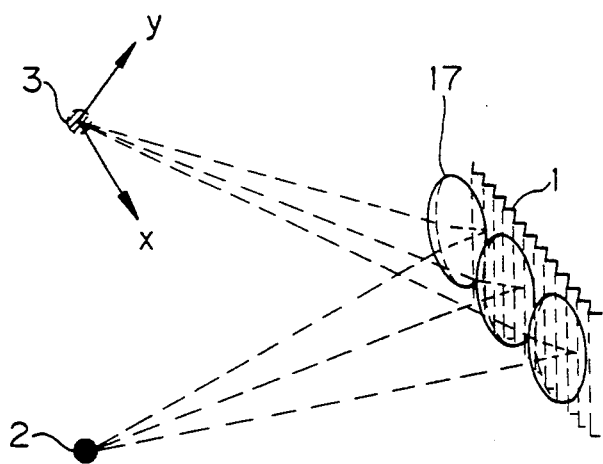
FIG. 69 shows a fundamental construction of the fifth embodiment.

In an optical imaging device according to the fifth embodiment, a reflecting plate and an array of convex lenses are combined. When a convex lens is arranged directly in front of the reflecting plate, an image component of the direction parallel to the arrangement direction is projected as shown in FIGS. 42 and 43, and an image component perpendicular to the arrangement direction is also projected at the same position as shown in FIG. 68. Therefore, the obtained image is an equal-magnification image in both direction, and an erect image is obtained in the arrangement direction and an inverted image is obtained in the other direction. When these convex lenses are arranged in front of the reflecting plate 1, as shown in FIG. 69, each convex lens projects an erect equal-magnification image in the arrangement direction, and therefore, each image overlaps images projected by adjacent convex lenses. Namely, an optical imaging device according to the fifth embodiment projects an image of a strip area.

An optical imaging device disclosed in Japanese Unexamined Patent Publication 56-117,201 also comprises an array of convex lenses and an array of pairs of reflecting surfaces, but since each convex lens corresponds to a pair of reflecting surfaces, each axis of the convex lenses is strictly required to match the center of pairs of reflecting surfaces, to obtain an even brightness distribution on an image plane. Particularly, when the positional difference between the convex lens and the pair of reflecting surfaces is a half of the pitch length of the pairs of reflecting surfaces, no image is projected at all. Therefore, the field area of such a combination of a convex lens and a pair of reflecting surfaces becomes dark and causes brightness variations. The principle of these phenomena is explained in the description of the fourth embodiment.

As described above, an even brightness distribution on the image plane can be obtained regardless of the relative positional difference when the correlations between the width W of the convex lens and the pitch length T of the pair of reflecting surfaces satisfy the above-mentioned formula (7), or the width W is sufficiently large compared to the pitch length T.

Figure 70:
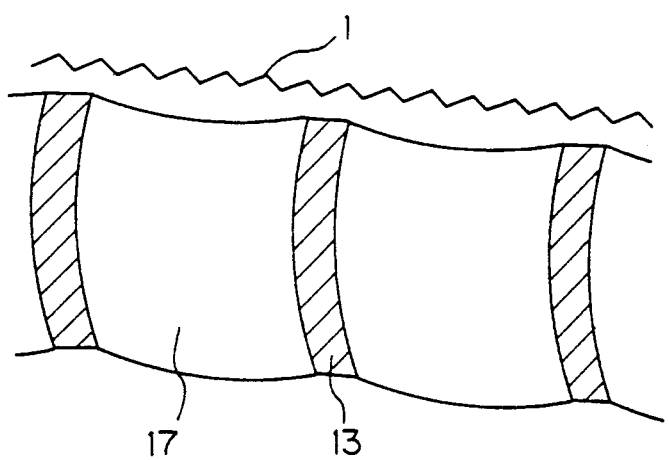
FIG. 70 shows an example of a configuration of a convex lens array.

The form of each convex lens may be circular as shown in FIG. 69, but if desired, can be square as shown in FIG. 70, to obtain an even brightness distribution on the image plane. Note, when the width W is sufficiently large compared with the pitch length T, the optical imaging device having square from convex lenses also can project an even image.

Light shield means and light shield surfaces are also effective in the fifth embodiment, and areas 13 are examples of the light shield means, which can be formed by paint.

Many modifications for applying an optical imaging device according to the fifth embodiment to machines can be made, and these modifications are illustrated in the following. In the Figures, the pairs of reflecting surfaces are shown to be small compared to the convex lenses, but the modifications are substantially the same as in all other cases. The pairs of reflecting surfaces of the reflecting plate 1 are formed of an array of prisms, and the surfaces of the prisms are treated by the metal deposition treatment, for an enhanced reflection.

Figure 71A:
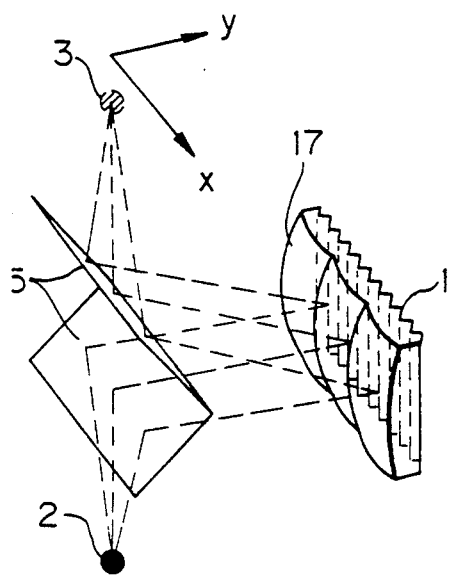
FIGS. 71A, 72A, 73A, 74A, 75A and 76A are perspective views of modifications of the fifth embodiment.
Figure 71B:
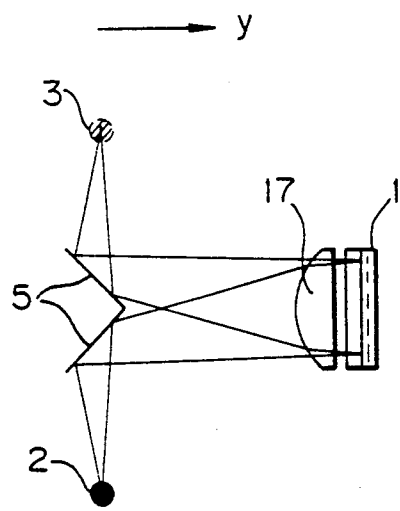
FIGS. 71B, 72B, 73B, 74B, 75B and 76B are cross sectional views of these modifications.

In the modification shown in FIGS. 71A and 71B, an array of convex lenses and an array of pairs of reflecting surfaces are incorporated. Further, this modification comprises two folding mirrors 5 for parallelizing a object surface and an image plane. The image area is a strip having a long axis in the x direction, and the image 3 of the point object 2 is obtained at the same position as shown in FIGS. 47A and 47B. The obtained image is an equal-magnification image in the x and y directions.

Figure 72A:
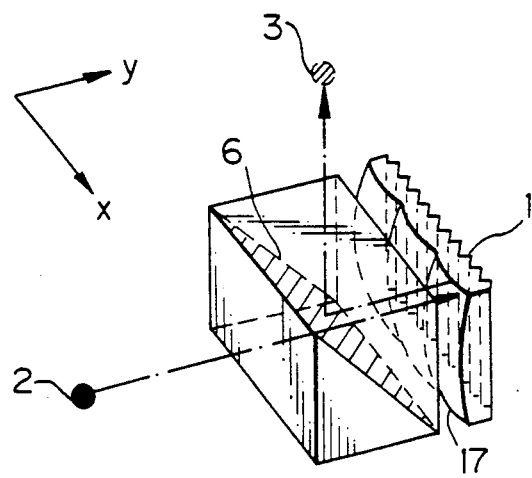
Figure 72B:
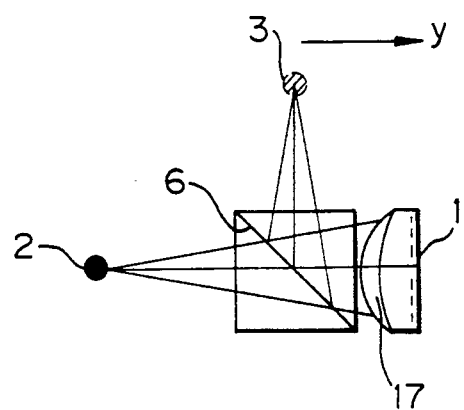

A modification shown in FIGS. 72A and 72B comprises a beam splitter having a semitransparent mirror 6 for diving optical paths to an object side and an image side. The object surface is perpendicular to the image plane.

Figure 73A:
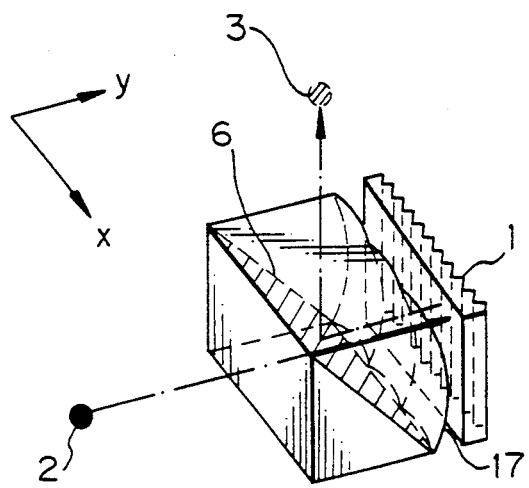
Figure 73B:
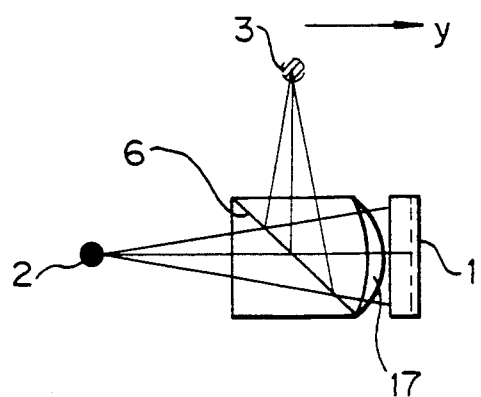

In the modification shown in FIGS. 73A and 73B of convex lenses 17, a beam splitter, is incorporated and the object plane and the image plane are perpendicular.

Figure 74A:
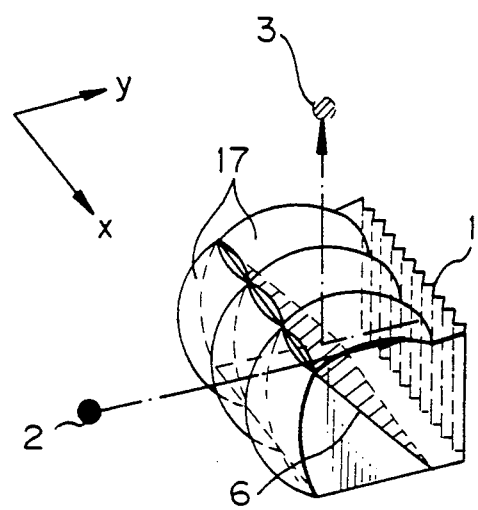
Figure 74B:
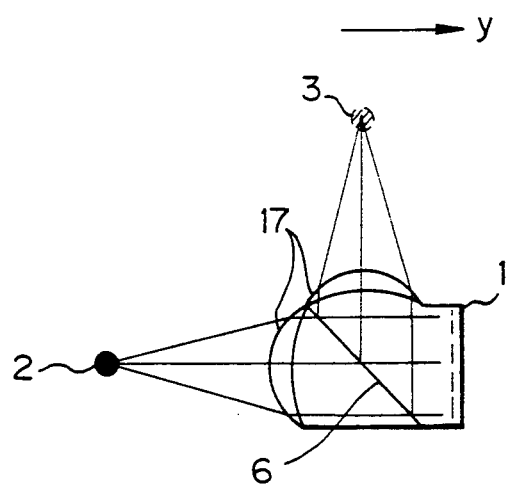

FIGS. 74A and 74B show an example as a comparison of the positions of the arrays of convex lenses. The modification as shown in FIGS. 74A and 74B can fundamentally project an image, but the agreement of the corresponding axes of both convex lens arrays is difficult. Further, since the distance between the image plane and the convex lens surface is short, the brightness variation on the image plane is easily made large, and therefore, this modification is not preferable.

Figure 75A:
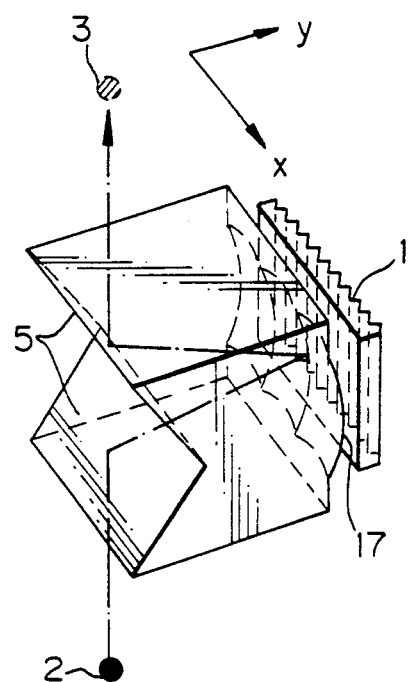
Figure 75B:
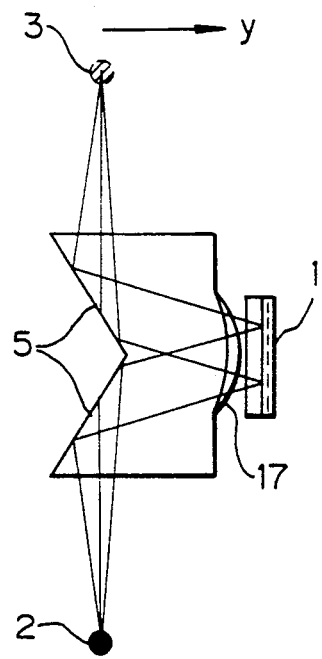

In the modification shown in FIGS. 75A and 75B, an array of convex lenses 17 and two folding mirror 5 are incorporated.

Figure 76A:
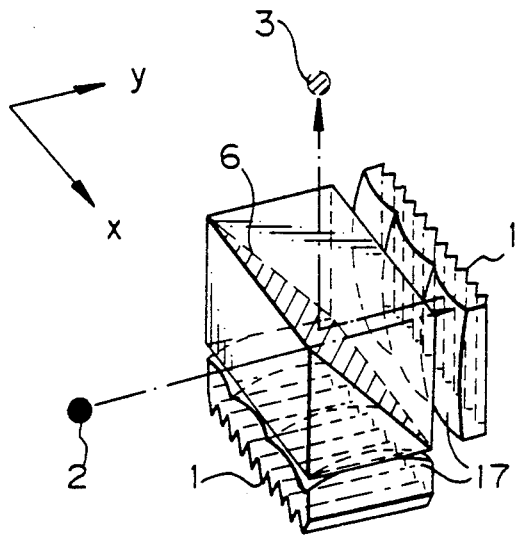
Figure 76B:
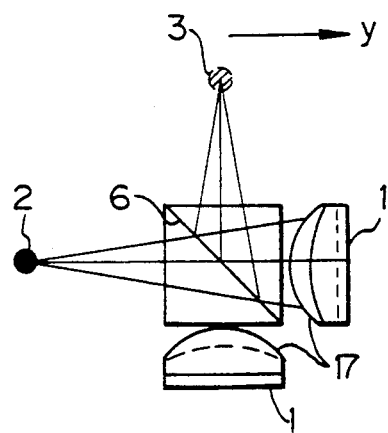

As described above, when a beam splitter is used, the obtained image become dark. In a modification shown in FIGS. 76A and 76B, two blocks having an array of convex lenses and a reflecting plate are included, and the brightness of obtained image is double that obtained in FIGS. 72A and 72B. When the relative position of one array of convex lenses to the other changes in the x direction, a position exists at which a brightness variation on the image plane becomes a minimum value due to a mutual interference there between. Therefore, the brightness variation on the image plane can be made smaller, compared to FIGS. 72A and 72B, by adjusting the relative positions of the two blocks.

Many widely different embodiments of the present invention may be constructed without departing from the spirit and scope of the present invention, and it should be understood that the present invention is not limited to the specific embodiments described in this specification, except as defined in the appended claims.

I claim:

1. An optical imaging device for projecting an image of a strip area from an object plane via an optical path to an image plane, comprising:

reflecting means having a plurality of pairs of reflecting surfaces arranged on a flat surface and forming an array extending in a first direction parallel to a long axis of said strip area, each pair of said reflecting surfaces being composed of two flat surfaces crossing at a $\pi/2$ radian, and each crossing line of two adjacent said reflecting surfaces being perpendicular to said first direction; and cylindrical focusing means having a focusing power directed only to a second direction perpendicular to said first direction, said cylindrical focusing means projecting said image component of said second direction from said object plane to said image plane;

when said optical path is divided into two parts from said object plane to said reflecting means and from said reflecting means to said image plane, each of said two parts of said optical path respectively have a substantially equal parameter $\gamma$, as given by a following formula (1);

$$\gamma = \Sigma_k (l_k/n_k) \qquad (1)$$

where
- $l_k$ is a thickness of each medium in respective optical paths,
- $n_k$ is a refractive index of said medium in respective optical paths.

2. An optical imaging device as set forth in claim 1, wherein said pair of reflecting surfaces of said reflecting means is a total reflection prism made of a material having a refraction index which is more than a square root 2.

3. An optical imaging device as set forth in claim 1, wherein said optical imaging device further comprises a plurality of light shield surfaces respectively arranged in front of said pairs of reflecting surfaces, each of said light shield surfaces being perpendicular to said first direction.

4. An optical imaging device as set forth in claim 1, wherein said cylindrical focusing means comprises at least one cylindrical lens.

5. An optical imaging device as set forth in claim 1, wherein said cylindrical focusing means comprises at least one cylindrical mirror.

6. An optical imaging device as set forth in claim 1, wherein said cylindrical focusing means comprises at least one cylindrical lens and one cylindrical mirror 7. An optical imaging device as set forth in claim 1, wherein constructions and positions of said cylindrical focusing means are equal and symmetrically opposite to said reflecting means.

8. An optical imaging device for projecting an image of a strip area from an object plane via an optical path to an image plane, comprising:

reflecting means having a plurality of pairs of reflecting surfaces arranged on a flat surface and forming an array extending in a first direction parallel to a long axis of said strip area, each pair of said reflecting surfaces being composed of two surfaces crossing at an angle $\theta$, and each crossing line of two adjacent said reflecting surfaces being perpendicular to said first direction, and cylindrical focusing means having a focusing power directed only to a second direction perpendicular to said first direction, said cylindrical focusing means projecting said image component of said second direction from said object plane to said image plane;

when said optical path is divided into two parts from said object plane to said reflecting means and from said reflecting means to said image plane, and each of said two parts of said optical path respectively have a substantially equal parameter $\gamma$, as given by a following formula (1), said angle $\theta$ being within a range given by formulas (2) and (3), $$\gamma = \Sigma_k (l_k/n_k) \qquad (1)$$

$$\pi/2 - \epsilon < \theta < \pi/2 \qquad (2)$$

$$\epsilon = d/(2n_0 \gamma_0) \qquad (3)$$

where,

- $l_k$ is a thickness of each medium in respective optical paths,
- $n_k$ is a refractive index of each medium in respective optical paths,
- d is a pitch width of each pair of reflecting surfaces,
- $n_0$ is a refractive index of the medium including pairs of reflecting surfaces, and
- $\gamma_0$ is an $\gamma$ of the optical path from said reflecting means to said object plane or said image plane.

9. An optical imaging device as set forth in claim 8, wherein said pair of reflecting surfaces of said reflecting means is composed of a total reflection prism made of a material having a refraction index which is more than a square root 2.

10. An optical imaging device as set forth in claim 8, wherein said optical imaging device further comprises a plurality of light shield surfaces arranged respectively in front of said pairs of reflecting surfaces, each of said light shield surfaces being perpendicular to said first direction.

11. An optical imaging device as set forth in claim 8, wherein said cylindrical focusing means comprises at least one cylindrical lens.

12. An optical imaging device as set forth in claim 8, wherein said cylindrical focusing means comprises at least one cylindrical mirror.

13. An optical imaging device as set forth in claim 8, wherein said cylindrical focusing means comprises at least one cylindrical lens and one cylindrical mirror.

14. An optical imaging device as set forth in claim 8, wherein constructions and positions of said cylindrical focusing means are equal and symmetrically opposite to said reflecting means.

15. An optical imaging device for projecting an image of a strip area from an object plane via an optical path to an image plane, comprising:

reflecting means having a plurality of pairs of reflecting surfaces arranged on a flat surface and forming an array extending in a first direction parallel to a long axis of said strip area, each pair of said reflecting surfaces being composed of two crossing surfaces, and each crossing line of two adjacent said reflecting surfaces being perpendicular to said first direction, at least one surface of said crossing surfaces being a cylindrical surface which has a focusing power directed only to said first direction, each pair of said reflecting surfaces respectively projecting an erect equal-magnification image component of said first direction from said object plane to said image plane; and cylindrical focusing means having a focusing power directed only to a second direction perpendicular to said first direction, said cylindrical focusing means projecting said image component of said second direction from said object plane to said image plane;

when said optical path is divided into two parts from said object plane to said reflecting means and from said reflecting means to said image plane, and each of said two parts of said optical path respectively have a substantially equal parameter $\gamma$, as given by a following formula (1);

$$\gamma = \Sigma_k (l_k/n_k) \qquad (1)$$

where
- $l_k$ is a thickness of each medium in respective optical paths, $n_k$ is a refractive index of said medium in respective optical paths.

16. An optical imaging device as set forth in claim 15, wherein said pair of reflecting surfaces of said reflecting means is a total reflection prism made of a material having a refraction index which is more than square root 2.

17. An optical imaging device as set forth in claim 15, wherein said optical imaging device further comprises a plurality of light shield surfaces arranged respectively in front of said pairs of reflecting surfaces, each of said light shield surfaces being perpendicular to said first direction.

18. An optical imaging device as set forth in claim 15, wherein said cylindrical focusing means comprises at least one cylindrical lens.

19. An optical imaging device as set forth in claim 15, wherein said cylindrical focusing means comprises at least one cylindrical mirror.

20. An optical imaging device as set forth in claim 15, wherein said cylindrical focusing means comprises at least one cylindrical lens and one cylindrical mirror.

21. An optical imaging device as set forth in claim 15, wherein constructions and positions of said cylindrical focusing means are equal and symmetrically opposite to said reflecting means.

22. An optical imaging device for projecting an image of a strip area from an object plane via an optical path to an image plane, comprising:
reflecting means having a plurality of pairs of reflecting surfaces arranged on a flat surface and forming an array extending in a first direction parallel to a long axis of said strip area, each pair of said reflecting surfaces being composed of two flat surfaces crossing at a $\pi/2$ radian, and each crossing line of two adjacent said reflecting surfaces being perpendicular to said first direction;
a first cylindrical lens array having a plurality of same cylindrical lenses arranged on a flat surface and forming an array extending in said first direction, each of said cylindrical lens having a focusing power directed only to said first direction, said object plane and said image plane being on focal planes of said cylindrical lens, and
second cylindrical focusing means having a focusing power directed only to a second direction perpendicular to said first direction, said cylindrical focusing means projecting said image component of said second direction from said object plane to said image plane;
said optical path from said object plane to said image plane being reflected at said reflecting means and passing through said first cylindrical lens array before and after being reflected at said reflecting means and further passing through said second cylindrical focusing means,
each combination of cylindrical lens of said first cylindrical lens array and said reflecting means projecting an erect equal-magnification image on said image plane having overlapping portions relative to other image patterns produced by other combinations of said first cylindrical lens and reflecting means.

23. An optical imaging device as set forth in claim 22, wherein a width W of each cylindrical lenses of said first cylindrical lens array is equal to a value given by the following formula (4), $$W = (N+0.5)T \quad (4)$$

where,
T is a width of each pair of reflecting surfaces,
N is an integer of more than 1.

24. An optical imaging device as set forth in claim 22, wherein the width of each cylindrical lens of said first cylindrical lens array is more than triple a pitch length of each pair of reflecting surfaces.

25. An optical imaging device as set forth in claim 22, wherein said pair of reflecting surfaces of said reflecting means is a total reflection prism made of a material having a refraction index which is more than a square root 2.

26. An optical imaging device as set forth in claim 22, wherein said optical imaging device further comprises a plurality of light shield surfaces arranged respectively in front of said pairs of reflecting surfaces, each of said light shield surfaces being perpendicular to said first direction.

27. An optical imaging device as set forth in claim 22, wherein said second cylindrical focusing means comprises at least one cylindrical lens.

28. An optical imaging device as set forth in claim 22, wherein said second cylindrical focusing means comprises at least one cylindrical mirror.

29. An optical imaging device as set forth in claim 22, wherein said second cylindrical focusing means comprises at least one cylindrical lens and one cylindrical mirror.

30. An optical imaging device as set forth in claim 22, wherein constructions and positions of said second cylindrical focusing means are equal and symmetrically opposite to said reflecting means.

31. An optical imaging device for projecting an image of a strip area from an object plane via an optical path to an image plane, comprising:
reflecting means having a plurality of pairs of reflecting surfaces arranged on a flat surface and forming an array extending in a first direction parallel to a long axis of said strip area, each pair of said reflecting surfaces being composed of two flat surfaces crossing at a $\pi/2$ radian, and each crossing line of two adjacent said reflecting surfaces being perpendicular to said first direction; and
focusing means having a plurality of convex lenses flatly arranged on a flat surface and forming an array extending in a first direction parallel to a long axis of said strip area, each of said convex lenses having a same focal length;
each combination of convex lens of said focusing means and said reflecting means projecting an erect equal-magnification image on said image plane having overlapping portions relative to other image patterns produced by other combinations of said convex lens and reflecting means;
a width W of each convex lens of said focusing means being equal to a value given by the following formula (4);

$$W = (N+0.5)T \quad (4)$$

wherein,
T is a pitch length of each pair of reflecting surfaces,
N is an integer of more than 1.

32. An optical imaging device as set forth in claim 31, wherein said pair of reflecting surfaces of said reflecting means is a total reflection prism made of a material having a refraction index which is more than a square root 2.

33. An optical imaging device as set forth in claim 31, wherein said optical imaging device further comprises a plurality of light shield surfaces arranged respectively in front of said pairs of reflecting surfaces, each of said light shield surfaces being perpendicular to said first direction.

34. An optical imaging device as set forth in claim 31, wherein said optical imaging device further comprises reflecting means for folding optical paths.

35. An optical imaging device for projecting an image of a strip area from an object plane via an optical path to an image plane, comprising:
reflecting means having a plurality of pairs of reflecting surfaces arranged on a flat surface and forming an array extending in a first direction parallel to a long axis of said strip area, each pair of said reflecting surfaces being composed of two flat surfaces crossing at a $\pi/2$ radian, and each crossing line of two adjacent said reflecting surfaces being perpendicular to said first direction; and
focusing means having a plurality of convex lenses flatly arranged on a flat surface and forming an array extending in a first direction parallel to a long axis of said strip area, each of said convex lenses having a same focal length;
each combination of such convex lenses of said focusing means and said reflecting means projecting an erect equal-magnification image on said image plane having overlapping portions relative to other image patterns produced by other combinations of said convex lenses and reflecting means;
the width of each convex lens of said focusing means being more than triple a pitch length of each pair of reflecting surfaces.

36. An optical imaging device as set forth in claim 35, wherein said pair of reflecting surfaces of said reflecting means is a total reflection prism made of a material having a refraction index which is more than a square root 2.

37. An optical imaging device as set forth in claim 35, wherein said optical imaging device further comprises a plurality of light shield surfaces arranged respectively in front of said pairs of reflecting surfaces, each of said light shield surfaces is perpendicular to said first direction.

38. An optical imaging device as set forth in claim 35, wherein said optical imaging device further comprises reflecting means for folding optical paths.

* * * * *